United States Patent
Gonzalez-Martin et al.

[11] Patent Number: 6,149,810
[45] Date of Patent: Nov. 21, 2000

[54] MEMBRANE WITH SUPPORTED INTERNAL PASSAGES

[75] Inventors: Anuncia Gonzalez-Martin, San Jose, Calif.; Carlos E. Salinas, Bryan; Alan J. Cisar, Cypress, both of Tex.; G. Duncan Hitchens; Oliver J. Murphy, both of Bryan, Tex.

[73] Assignee: Lynntech, Inc., College Station, Tex.

[21] Appl. No.: 09/009,061

[22] Filed: Jan. 20, 1998

Related U.S. Application Data

[60] Continuation-in-part of application No. 08/806,785, Feb. 26, 1997, Pat. No. 5,916,505, which is a division of application No. 08/344,813, Nov. 23, 1994, Pat. No. 5,635,039.

[51] Int. Cl.$^7$ .......................... B01D 69/06; B01D 71/40
[52] U.S. Cl. ...................... 210/321.84; 210/321.75; 204/252; 204/282; 204/296
[58] Field of Search .................. 210/321.75, 321.84, 210/500.21; 429/30, 33, 40, 44; 204/252, 257, 282, 283, 290 F, 290 R, 296

[56] References Cited

U.S. PATENT DOCUMENTS

| | | |
|---|---|---|
| 3,134,697 | 5/1964 | Niedrach . |
| 3,432,355 | 3/1969 | Niedrach et al. . |
| 3,730,351 | 5/1973 | Veronesi et al. ............ 210/321.75 |
| 3,796,313 | 3/1974 | Bigt et al. ............... 210/321.75 |
| 3,926,797 | 12/1975 | Gigou et al. .................. 210/335 |
| 4,118,299 | 10/1978 | Maget . |
| 4,176,069 | 11/1979 | Metz et al. ............... 210/321.75 |
| 4,214,969 | 7/1980 | Lawrance . |
| 4,313,808 | 2/1982 | Idemoto et al. .............. 204/301 |
| 4,375,395 | 3/1983 | Foller et al. . |
| 4,416,747 | 11/1983 | Menth et al. . |
| 4,417,969 | 11/1983 | Ezzell et al. . |
| 4,541,989 | 9/1985 | Foller . |
| 4,794,088 | 12/1988 | Miyaki et al. ........... 210/500.21 |
| 4,836,929 | 6/1989 | Laumann et al. . |
| 4,876,115 | 10/1989 | Raistrick . |
| 4,927,800 | 5/1990 | Nishiki et al. . |
| 5,049,233 | 9/1991 | Davis ...................... 156/642 |
| 5,242,764 | 9/1993 | Dhar . |
| 5,246,792 | 9/1993 | Watanabe . |
| 5,262,250 | 11/1993 | Watanabe . |
| 5,635,039 | 6/1997 | Cisar et al. . |

FOREIGN PATENT DOCUMENTS

| | | |
|---|---|---|
| 6-67733 | 3/1994 | Japan . |
| 7-249418 | 9/1995 | Japan . |

OTHER PUBLICATIONS

1995: 986552 "Electrolyte membranes, their manufacture, and fuel cells".

"Synthesis of Hydrogen Peroxide in a Proton Exchange Membrane Electrochemical Reactor," Pallav Tatapudi and James M. Fenton, Apr. 1993, L55–L57.

"Management of the Water Content in Polymer Electrolyte Membranes with Porous Fiber Wicks," Masahiro Watanabe, Yasutaka Satoh, and Chiyoka Shimura, Nov. 1993, pp. 3190–3193.

"Barriers to flow in semicrystalline ionomers. A procedure for preparing melt–processed perfluorosulfonate ionomer films and membranes," Robert B. Moore, Kevin M. Cable and Timothy L. Croley, 1992, pp. 7–14.

*Primary Examiner*—John Kim
*Attorney, Agent, or Firm*—Streets & Steele; Jeffrey L. Streets; Patrick K. Steele

[57] ABSTRACT

The invention provides an improved proton exchange membrane for use in electrochemical cells having internal passages parallel to the membrane surface comprising permanent tubes preferably placed at the ends of the fluid passages. The invention also provides an apparatus and process for making the membrane, membrane and electrode assemblies fabricated using the membrane, and the application of the membrane and electrode assemblies to a variety of devices, both electrochemical and otherwise. The passages in the membrane extend from one edge of the membrane to another and allow fluid flow through the membrane and give access directly to the membrane.

40 Claims, 13 Drawing Sheets

MEMBRANE WITH SUPPORTED INTERNAL PASSAGES

This application is a continuation-in-part of U.S. patent application Ser. No. 08/806,785 filed Feb. 26, 1997, U.S. Pat. No. 5,916,505, which is a divisional of U.S. patent application Ser. No. 08/344,813 filed Nov. 23, 1994, now U.S. Pat. No. 5,635,039.

The present invention was made with Government support under contract NAS3-27390 awarded by NASA. The Government has certain rights in this invention.

BACKGROUND OF THE INVENTION

1. Field of the Invention

The present invention relates to the use and manufacture of proton exchange membranes and their application in membrane and electrode assemblies for fuel cells, electrolyzers, electrochemical hydrogen and oxygen pumps, and related devices.

2. Background of the Related Art

Electrochemical cells in which a chemical reaction is forced by adding electrical energy are called electrolytic cells. Central to the operation of any cell is the occurrence of oxidation and reduction reactions which produce or consume electrons. These reactions take place at electrode/solution interfaces, where the electrodes must be good electronic conductors. In operation, a cell is connected to an external load or to an external voltage source, and electric charge is transferred by electrons between the anode and the cathode through the external circuit. To complete the electric circuit through the cell, an additional mechanism must exist for internal charge transfer. This is provided by one or more electrolytes, which support charge transfer by ionic conduction. Electrolytes must be poor electronic conductors to prevent internal short circuiting of the cell.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode.

A typical electrochemical cell will have a positively charged anode and a negatively charged cathode. The anode and cathode are typically submerged in a liquid electrolytic solution which may be comprised of water and certain salts, acids or base materials. Generally speaking, the anode and cathode are made of a substrate material, such as titanium, graphite, or the like, coated with a catalyst such as lead dioxide or other known materials. The selection of a substrate and catalyst is determined by the particular electrode reactions which are to be optimized in a given situation.

The cathode and anode are positioned within the electrolytic cell with electrical leads leading to the exterior. The cell may be provided with appropriate plumbing and external structures to permit circulation of the electrolyte to a separate heat exchanger. Suitable inlet and outlet passages may also be provided in the cell head space to permit the withdrawal of the gases evolved from the cathode (if gases are to be evolved) and from the anode.

In order to maintain or reduce the temperature of the cell electrodes, heat exchange passages may be provided within the electrode structures. These coolant passages are connected to external sources of coolant liquid which can be circulated through the electrodes during the electrolysis process in order to maintain or reduce their temperatures.

In order to drive the electrolysis reaction, it is necessary to apply electric power to the cell electrodes. The electrodes are connected through the electrical leads to an external source of electric power with the polarity being selected to induce the electrolyte anion flow to the anode and the cation flow to the cathode.

U.S. Pat. No. 3,134,697 (Niedrach) teaches a combination electrode structure and electrolyte for a fuel cell comprising a hydrated, ion exchange resin membrane having a gas adsorbing metal electrode integrally bonded and embedded in each of its two major surfaces. The assembly of the ion exchange membrane and electrode(s) is placed between platens and subjected to sufficient pressure, preferably at an elevated temperature, to cause the resin in the membrane to flow.

U.S. Pat. No. 4,375,395 (Foller) teaches that anodes made of glassy carbon are suitable for use in the preparation of ozone in an electrolytic cell utilizing an aqueous solution of the highly electronegative fluoro-anions.

U.S. Pat. No. 4,541,989 (Foller) teaches that a liquid electrolyte containing acids of fluoro-anions, such as $HBF_4$ and $HPF_6$, used in combination with a cool electrolyte solution can increase the efficiency and the ozone to oxygen yield. However, the use of a liquid electrolyte causes some problems. First, the electrodes in such electrolytic cell must be separated by a given distance to provide definition. This translates into power loss in the production of heat. Secondly, the presence of liquid electrolytes requires a sophisticated system of seals to prevent leaking of the electrolyte.

U.S. Pat. No. 4,836,929 (Laumann et al.) teaches the use of a solid electrolyte such as that made by DuPont and sold under the brand NAFION (NAFION is a trademark of the DuPont de Nemoirs Company of Wilmington, Del.). This solid perfluorinated sulphonic acid electrolyte was placed between a lead dioxide anode and a platinum black cathode. The current efficiency was increased by oxygenating a water stream fed to the anode and the cathode. In this manner, oxygen could be reduced to water at room temperature releasing an increased yield of ozone.

In his paper entitled "Synthesis of Hydrogen Peroxide in a Proton Exchange Membrane Electrochemical Reactor" (April 1993), Fenton disclosed an electrochemical reactor that used a membrane and electrode assembly (M&E) comprised of a NAFION 117 membrane between the platinum black/polytetrafluoroethylene (PTFE) anode and graphite/PTFE cathode. This M&E assembly was sandwiched between a carbon fiber paper (Toray Industries) on the cathode side and a platinum mesh (52 mesh, Fisher Scientific) on the anode side which were used as current collectors.

Increasing the percentage of PTFE in the electrode increases the hydrophobicity of the electrode assembly and thus allows more of a gaseous reactant to reach the electrode surface by repelling the products formed. The graphite M&E with 20% PTFE produced slightly greater hydrogen peroxide than a similar M&E with 10% PTFE. This could be due to the mass transport limitation of oxygen to the membrane and electrode assembly within the less hydrophobic 10% M&E. It is preferred that the proton exchange membrane reactor operate at potentials greater than 3.0 volts where the anodic evolution of ozone is favored.

NAFION is a sulfonic acid membrane sold by E. I. DuPont Company having a substantially fluorinated backbone and pendant groups according to the following structure:

—OCF$_2$CF(CF$_3$)—O—CF$_2$CF$_2$SO$_3$H

Both NAFION 117 (purchased from Aldrich Chemical Company) and NAFION 115 have equivalent weights of 1100 and thicknesses of 7 mils (175 μm) and 5 mils (125 μm), respectively.

U.S. Pat. No. 4,417,969 (Ezzell et al.) discloses ion exchange membranes having sulfonic acid groups. The membrane is a polymer having a substantially fluorinated backbone and recurring pendant sulfonic acid groups represented by the following general formula:

—O(CFR$^1$)$_b$(CFR$^2$)$_a$SO$_3$Y where a and b are independent integers from zero to three with the condition that the sum of a and b must be at least one; R$^1$ and R$^2$ are independently selected from the group consisting of a 4 halogen and a substantially fluorinated alkyl group having one or more carbon atoms; and Y is hydrogen or an alkali metal.

Membranes containing perfluorinated sulphonic acids are typically prepared before use in an electrochemical cell by first soaking the membrane in hot water for about 30 minutes and then soaking it in a mineral acid solution such as 10% HCl to ensure that the entire membrane is in the proton (H$^+$) form. The membrane has to be kept moist at all times since it acts as a conductor only when it is wet.

U.S. Pat. No. 4,416,747 (Menth et al.) discloses an individual electrolysis cell bounded by bipolar plates and having a solid electrolyte made of a polymer of perfluorinated sulphonic acid (NAFION by DuPont) with a surface coating centrally located between current-collectors and adjoining open metallic structures. A plurality of individual cells may be integrated together between end plates so that the cells are electrically connected in series, hydrodynamically connected in parallel, and combined to form a block.

U.S. Pat. No. 4,876,115 (Raistrick) discloses a gas reaction fuel cell utilizing porous gas diffusion electrodes formed of carbon particles defining interstitial spaces which expose a catalyst that is supported on the carbon. A solution containing a proton conducting material, such as a perfluorocarbon copolymer, is dispersed over the surface of the electrode to coat the carbon surfaces adjacent the interstitial spaces without impeding gas flow into the interstitial spaces. In this manner, the proton conducting material enables protons produced by the gas reactions adjacent the supported catalyst to have a conductive path with the electrolyte membrane and the carbon particles enable the electrons to have a conductive path to the external circuit.

U.S. Pat. No. 5,242,764 (Dhar) discloses that by depositing a proton conducting material, such as a perfluorocarbon copolymer, on the catalytic side of gas diffusion electrodes, acting as anode and cathode, it is possible to avoid the use of an electrolyte membrane.

U.S. Pat. No. 5,246,792 (Watanabe) discloses an ion exchange membrane having a thin ion-conductive layer with a lower glass transition temperature than that of the ion exchange membrane applied on at least one surface of the membrane. The thin layer, comprising a solution such as a perfluorocarbon copolymer in cyclohexanol, is hot pressed between the membrane and the electrode at a temperature between the glass transition temperatures of the membrane and the thin layer.

The need for water to support proton conduction in the membrane has been addressed in a number of ways. In fuel cells it would initially appear that since water is the product, sufficient water would be already present. Unfortunately, the water formed in a fuel cell is inadequate to maintain membrane hydration except under low current density conditions. Each proton that moves through the membrane drags at least two or three water molecules with it. As the current density increases the number of water molecules moved through the membrane also increases. Eventually the flux of water being pulled through the membrane by the proton flux exceeds the rate at which they return by diffusion. At this point the membrane begins to dry out, and its internal resistance increases. This sets a relatively low limit on the current density that can be maintained by back diffusion from the cathode surface.

This problem has typically been addressed by adding water, as vapor, to the hydrogen containing stream, or to both gas streams (fuel and oxidizer). There is no doubt that this method works, and high power densities can be achieved. Unfortunately, adding a humidifier to the cell stack adds to the size, weight and complexity of the system. If this can be avoided, it would be a great improvement.

A solid state hydrogen pump has all of the same problems as a fuel cell, without the presence of a water forming reaction at the cathode. As with a fuel cell, eliminating the need for a humidifier will lead to a smaller, simpler, and lighter system.

An electrolyzer, especially one designed to produce hydrogen and oxygen from water offers a different set of problems. A water electrolyzer contains essentially the same parts as a fuel cell, but the polarity is reversed, as are all of the electrochemical reactions. Instead of generating electricity and water from hydrogen and oxygen, it produces hydrogen and oxygen from water and electricity.

In an electrolyzer there is always water present to keep the membrane hydrated. The problems arise in the electrodes and on the gas outlet side. Because liquid water is present in the same compartment that gas is being generated in, the gas outlet flow will nearly always be two phase with a large quantity of water being carried out with the gas.

A more fundamental problem arises in the electrodes. Since maximum current efficiency requires that liquid water be in contact with the membrane, at least one of the electrodes must be hydrophilic. While a hydrophilic electrode is best for the membrane, it tends to impede gas bubble formation and gas removal. If the water is supplied directly to the membrane, fully hydrophobic electrodes could be used, to maintain efficient gas evolution.

These problems are further exacerbated in a regenerative fuel cell. Since a regenerative fuel cell by definition must operate in turn as both an electrolyzer and a fuel cell, using hydrophilic electrodes that produce effective operation in a liquid water environment for electrolyzer operation virtually guarantees electrode flooding during fuel cell operation. If operation with liquid water present in the electrode compartment can be avoided, then hydrophobic electrodes can function well in both modes.

One method that has previously been proposed for directly humidifying a proton exchange membrane is the inclusion of water conducting wicks as part of the membrane structure. While this method has some effectiveness, the amount of flow that can be achieved through the membrane is limited. A further drawback to the wicks is that they rely on wetting to promote flow. This precludes their use to introduce non-aqueous streams into the proton exchange membrane.

In addition, the wicks act as filtering elements to remove any particles in the stream. This limits their use to systems with pure water, or where care is taken to prevent the solution from becoming saturated and beginning to precipitate.

Electrochemical water desalination or clean-up systems based on the electroosmosis occurring in a hydrogen pump has some additional difficulties other than those noted above for a simple hydrogen pump. This type of system uses the fact that every proton passing through the membrane carries water with it, typically about two water molecules per proton. In devices described previously, the hydrogen and water to be purified are fed into the cell together as a solution saturated with hydrogen. Since the solubility of hydrogen in water is low, ($<10^{-5}$M), the current density is limited to a relatively low value. A low current density produces a low water purification rate.

Despite the aforementioned disclosures, there remains a need for membrane and electrode assemblies with improved proton conductivity from the anode to the cathode. Because the sulfonic acid polymers and other proton exchange membranes need water to support proton es conduction, there is a need for an improved system for supplying water to the membrane. Additionally, there is a need for membrane and electrode assemblies with improved potential-current density profiles. Finally, there is a need for smaller and less expensive electrolytic cells.

SUMMARY OF THE INVENTION

The present invention provides a membrane and a method for producing the membrane for use in electrochemical devices. The membrane comprises a sheet of ion exchange material having top and bottom surfaces, a passage extending through the sheet in a plane that is substantially parallel to the sheet surfaces, and a tube coupled to the sheet. The passage has an inside surface. The tube and passage are in fluid communication. Preferably, the ion exchange material is an electronically insulating fluorinated ion exchange material discussed below.

The tube and passage can be aligned axially and concentrically. The passage has first and second ends and the tube may be positioned near the first or second end of the passage, at both ends of the passage or at any point in between the ends.

The invention provides an ion exchange membrane having first and second side surfaces and a passage extending through the membrane in a plane that is substantially parallel to the membrane side surfaces, the passage has one or more compression resistant members. The compression resistant members are used to provide support for the passages when the membrane is made up in an electrochemical cell.

The invention also provides a membrane comprising a sheet having top and bottom surfaces and at least one passage formed within the sheet. The passage is substantially parallel to the sheet surfaces and has an inlet and a rigid tube coupled in axial alignment with the inlet. The passage may also have an outlet and a second rigid tube coupled in axial alignment with the outlet.

The invention provides an additional membrane consisting essentially of an ion exchange material having at least one passage formed within the ion exchange material. The passage comprises one or more compression resistant tubes in coaxial alignment with the passage. The compression resistant tubes may be made from partially or fully flourinated polymers. Some examples of partially or fully flourinated polymers are polytetrafluoroethylene, fluorinated ethlylene propylene, polyvinylidine fluoride, polyvinyl fluoride. Ideally, the passage is open and has substantially no restriction to fluid flow.

The invention also provides a membrane comprising a sheet of ion exchange material having top and bottom surfaces. The sheet forms a passage between the surfaces extending through the sheet in a plane that is substantially parallel to the sheet surfaces, and the passage has at least one compression resistant tube in direct fluid communication with the passage. The passage preferably has an inside surface, first and second ends, a first portion adjacent to the first end and a second portion adjacent to the second end. The compression resistant tube may be positioned in the first portion of the passage and/or in the second portion of the passage. The tube may also be positioned adjacent to the inside surface of the passage preferably between the first portion and the second portion of the passage.

In another embodiment of the invention, there is provided, a membrane comprising: a sheet of ion exchange material having top and bottom surfaces; a passage extending through the sheet in a plane that is substantially parallel to the sheet surfaces, the passages having and inside surface; and a compression resistant means coupled to the sheet. The compression resistant means may comprise a support structure positioned in a plane generally normal to the sheet surfaces so that the support structure is interspersed between the passages. Alternatively the compression resistant means may comprise a resilient strip, such as a flat spring, that is positioned around and in between the passages.

The invention provides a method for producing a membrane with internal passages comprising the steps of forming an ionically conducting material around a plurality of removable elements and a plurality of tubular members; and removing the removable elements from the membrane to form a passage having one or more of the tubular members positioned therein. This process may be followed by maintaining the pressed material at sufficient temperature and pressure to fuse the material into a single membrane. Preferably, the removable elements are positioned substantially parallel to one another and the plurality of tubular members are disposed over the removable elements.

The step of hot pressing may further comprise providing an ionically conducting material that is a perfluorinated sulfonic acid polymer; converting the perfluorinated sulfonic acid polymer to a psuedothermoplastic form prior to hot pressing by contacting the perfluorinated sulfonic acid polymer with a tetraalkyl ammonium ion; and returning the perfluorinated sulfonic acid polymer to the proton form after removing the elements.

BRIEF DESCRIPTION OF THE DRAWINGS

So that the features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
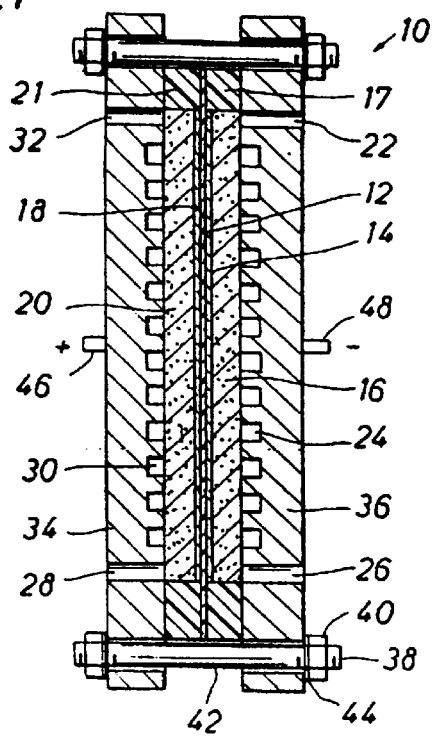
FIG. 1 is a cross-sectional side view of a depolarized ozone electrolysis cell.

Conventional water electrolysis devices utilize hydrogen formation ($2H^+ + 2e^- \rightarrow H_2$) as the cathodic reaction. However, in an ozone forming electrolysis device, there are considerable benefits to eliminating the hydrogen formation reaction and replacing it with oxygen reduction reactions at the cathode. The benefits of eliminating hydrogen formation in electrolysis systems for ozone generation include: (1) lower operating cell voltage; (2) elimination of hydrogen gas explosions; (3) elimination of reactions between hydrogen and ozone in the product; and (4) the ability to provide paired electrosynthesis of ozone at the anode and hydrogen peroxide at the cathode.

The electrochemical reactions of the present invention occur by applying DC electricity between the anode and cathode. Water is fed to the anode side where two competing water oxidation reactions take place; the thermodynamically favored oxygen ($O_2$) evolution reaction Equation (1) and the ozone ($O_3$) formation reaction Equation (2).

$$2H_2O \rightarrow O_2 + 4H^+ + 4e^- \quad \text{EQUATION (1)}$$

$$3H_2O \rightarrow O_3 + 6H^+ + 6e^- \quad \text{EQUATION (2)}$$

Utilization of high overpotentials, such as anode potentials much greater than 1.51 volts, and certain electrode materials enhance ozone formation at the expense of oxygen evolution. The water oxidation reactions yield protons and electrons which are recombined at the cathode. Electrons are conducted to the cathode via the external electronic circuit. The protons are carried through a solid electrolyte, such as a proton exchange membrane (PEM), which is available from DuPont under the trademark NAFION.

The cathodic reactions involving the reduction of oxygen are given below:

$$O_2 + 4H^+ + 4e^- \rightarrow 2H_2O \quad \text{EQUATION (3)}$$

$$O_2 + 2H^+ + 2e^- \rightarrow H_2O_2 \quad \text{EQUATION (4)}$$

Specialized gas diffusion electrodes are required for these reactions to occur efficiently. The presence of oxygen at the cathode suppresses the hydrogen ($H_2$) formation reaction. Furthermore, the oxygen reactions are thermodynamically favored over hydrogen formation. In this manner, the reduction of oxygen to either $H_2O$ or $H_2O_2$ reduces the overall cell voltage (i.e., the energy required to drive this system) below that required to evolve hydrogen ($H_2$) at the cathode in an aqueous solution.

The proton exchange membrane placed between the anode and cathode is made of a polymer material having sulfonate functional groups contained on a fluorinated carbon backbone. Two such materials include a NAFION PEM having an equivalent weight of 1100 grams and a Dow experimental PEM (XUS-13204.20) having an equivalent weight of 800 grams. NAFION 105, 115 and 117 will each operate satisfactorily in the present invention, with NAFION 115 and 117 have a thicknesses of 7 mils (175 $\mu$m) and 5 mils (125 $\mu$m), respectively, and a conductivity of about 0.05 $\Omega^{-1}$ cm$^{-1}$. NAFION 117 is the preferred NAFION product. The Dow Chemical PEM has a thickness in the dry state of 5 mils (125 $\mu$m) and a conductivity greater than 0.1 $\Omega^{-1}$ cm$^{-1}$ as measured with an AC bridge at $10^3$ Hz. The Dow membrane material is generally preferred because of its lower equivalent weight, higher conductivity and better water retention characteristics obtained in the resulting PEM.

In addition, it is anticipated that a sulfonated polymer having a nonfluorinated carbon backbone would be operable according to the present invention. Such a polymer might include polystyrene sulfonate. Additionally, such a material might be coated with a fluorinated material to increase its resistance to chemical attack. It is also anticipated that a proton exchange membrane made of a polymer material having carboxylate functional groups attached to a fluorinated carbon backbone would be operable according to the present invention. Examples of ion exchange membranes include those available from Tokuyama Soda Company under the trademark "NEOSEPT-F", Asahi Glass Company under the trademark "FLEMION", Asahi Chemical Industry Company under the trademark "ACIPLEX-S", and Tosoh Corporation under the trademark "TOSFLEX IE-SA48." Further, polymeric systems based on: perfluoro bis-sulfonimides ($CF_3[CF_2SO_2NHSO_2CF_2]_nCF_3$), perfluoro phosphonic acids, and the corresponding carbanion acids would function satisfactorily as proton exchange membranes according to the present invention. The Dow experimental PEM gives much superior performance as an ionic conductor than the NAFION PEM materials. However, NAFION has been determined to be better for impregnating platinum electrodes.

The use of a PEM instead of a liquid electrolyte offers several advantages: fluid management is simplified and the potential of leakage of corrosive liquids is eliminated; the membrane serves as an electronically insulating separator between the anode and cathode; and, the PEM/anode interface provides a chemical environment which is suited to the electrochemical ozone formation reaction.

The preferred PEMs contain perfluorinated sulfonic acids that display a very high resistance to chemical attack, such as NAFION 117 and NAFION 115. Dow Chemical's experimental PEM XUS-13204.20 is the most preferred.

Before being used, the membranes should be washed in various solutions to remove trace organic and inorganic contaminants. The purification procedure involves boiling the proton exchange membranes in a 10 vol. % aqueous $H_2O_2$ solution for one hour, boiling for a second hour in pure water, then boiling for a third hour in a fresh sample of pure water. The membranes are then removed and boiled for one hour in 0.5M $H_2SO_4$, followed by boiling for one hour each in two different samples of pure water. On completing the purification procedure, membrane specimens are stored in the last sample of wash water at room temperature.

In order to maximize electrocatalyst utilization in PEM fuel cells, the catalyzed electrode structures can be impregnated with solubilized PEM material. This treatment enhances the three-dimensional nature of the active catalyzed layers of fuel cell electrodes and gives rise to a reduction in activation and mass transport overpotentials. Voltage/current profiles for M&E assemblies that were pressed at 215° C. for 14 seconds at 5,000 psi and tested using a fuel cell temperature of 95° C. and $H_2/O_2$ gas pressures of 100 psi, show that NAFION-impregnated electrodes gave better performance than the corresponding Dow-impregnated electrodes. This unexpected result may be due to the fact that the lower equivalent weight of the Dow membrane with its associated higher sulfonic acid group content gives rise to increased water retention in the membrane which brings about flooding within the electrode structures and impedes the access of reactant gases to platinum catalyst sites. Hence, while the desired characteristics of the Dow PEM are most suitable when it is used as the proton exchange membrane itself, they may not be as appropriate as NAFION for impregnation within electrode structures. Thus, it seems that the best combination for an optimized M&E assembly is the use of the Dow experimental PEM as the electrolyte layer and dissolved NAFION as the electrolyte material to be used for impregnating catalyzed electrodes, so as to increase the three-dimensional character of fuel cell electrodes.

At high current densities, most of the electrochemical reaction occurs near the front surface of the catalyzed electrodes, indicating that most of the current is localized in the outer catalyzed layers of electrodes. Therefore, to achieve high power densities, it is advantageous to localize a large fraction of the electrocatalyst material in the outer layers of fuel cell electrodes. Fuel cell performance has been observed to increase with increasing platinum (Pt) catalyst loading, reaching a maximum at a loading of 5 mg Pt per $cm^2$. Relatively thick platinum-catalyzed active layers in electrodes having a platinum loading of 10 mg Pt per $cm^2$ may have introduced mass transport overpotentials, which hinder high fuel cell performance.

PEM-impregnated gas diffusion electrodes can be hot-pressed onto both sides of a purified proton exchange membrane, using a Carver hot press, to produce a membrane and electrode (M&E) assembly. The hot-pressing procedure involves placing a sandwich structure, consisting of the PEM and two electrodes-one at either side of the membrane-between the platens of the press at approximately 100 psi, where the platens have been previously heated to 100° C. After the temperature of the platens has been raised to within a preselected range of between 125° C. and 230° C., a preselected pressure in the range 1,000 psi to 50,000 psi is applied to the membrane and electrode assembly for a period of time varying from 15 seconds to 150 seconds. The hot pressed M&E's should be immediately removed from the hot press and mounted in an electrochemical cell.

Preferred conditions for the preparation of M&E assemblies were found to consist of a hot press temperature of 215° C., a hot pressing time of 45 seconds and a hot press pressure in the range 3,000 psi to 14,000 psi.

Lead dioxide anodes for use in the electrolytic cells of the invention may be prepared by anodic deposition. The choice of anodic substrates on which lead dioxide is deposited is limited since most metals dissolve when deposition is attempted. However, the valve metals, such as titanium, titanium suboxides (such as that produced by Atraverda Limited under the trademark "EBONEX"), platinum, tungsten, tantalum, niobium and haffnium are suitable as substrates for the anodes. When titanium, tungsten, niobium, haffiium or tantalum are utilized as substrate materials, they are first platinized to eliminate passivation problems sometimes encountered with the uncoated substrates.

Carbon in the form of graphite may be used as a substrate, however, lead dioxide adherence is a particular problem if the carbon has not been thoroughly degassed. The carbon is degassed by boiling in water for some time followed by vacuum drying over a period of days. When degassed, adherence is greatly improved with respect to thermal stress. Vitreous or glassy carbon does not appear to have the adherence problem.

Platinum is the most convenient substrate material to work with, gives the most uniform deposits, and does not present any additional problems. Platinum is therefore typically the most suitable substrate material for lead dioxide anodes. However, its high cost may make other previously mentioned substrate materials more practical for commercial use.

In any event, lead dioxide is plated onto substrates in a well known plating bath comprising essentially lead nitrate, sodium perchlorate, copper nitrate, and a small amount of sodium fluoride and water. The substrate material is set up as the anode in a plating bath with a pH maintained between 2 and 4. Current densities of between 16 and 32 milliamperes per square centimeter give bright, smooth and adherent lead dioxide deposits. Bath temperature is most usually maintained at about 60° C. at all times during deposition. The deposition is carried out with vigorous stirring of the electrolyte and rapid mechanical vibration of the anode to give consistently fine granular deposits free from pinholes or nodules. A surface active agent may be added to the plating solution to reduce the likelihood of gas bubbles sticking to the anode surface.

The limiting current for the cathodic reduction of dissolved oxygen in either water or aqueous solution may be described as follows:

$$i_l = \frac{n \times F \times D \times C_o}{d} \qquad \text{EQUATION (5)}$$

where:
$i_l$ is the limiting current;
n is the number of electrons consumed per oxygen molecule reduced to water;
F is the Faraday constant (96,484 Coulombs);
D is the diffusion coefficient of oxygen in water ($1.93 \times 10^{-5}$ cm$^2$s$^{-1}$);
$C_o$ is the concentration of oxygen in water ($1.41 \times 10^{-6}$ moles cm$^{-3}$); and
d is the diffusion layer thickness. (For a static liquid electrolyte, d is approximately 0.05 cm. For oxygen dissolved in a rapidly flowing or well-stirred solution, d is about 0.005 cm.)

Using the values given above, $i_l$ for the reduction of dissolved oxygen in water is $2.1 \times 10^{-3}$ Amps/cm$^2$. Given this low value of $i_l$, operation of an ozone electrolysis device with the reduction of dissolved oxygen as the cathodic reaction is only possible at current densities considerably below those required for efficient ozone generation at the anode. A system which relies upon dissolved oxygen at the cathode can produce high yields of ozone, but only if hydrogen formation occurs at the cathode. The full benefits of oxygen reduction cannot be incorporated into this type of system where liquid water is allowed to flow over the surface of the cathode electrode structure. The electrochemical reactor of the present invention provides pure air or oxygen gas to a gas diffusion cathode and feeds water only to the anode side.

The gas diffusion cathode consists of two layers: a semi-hydrophobic reaction layer (thickness of 5 μm to 100 μm) and a hydrophobic gas diffusion layer optionally having an imbedded metallic current collector or a carbon cloth or carbon fiber paper. The preferred reaction layer for the reduction of oxygen at the cathode consists of platinum black with 30% PTFE. The gas diffusion layer consists of a mixture of 4 parts carbon black and 6 parts PTFE with no platinum catalyst and having an imbedded current collector, either a metal screen, carbon cloth, or fibrous carbon paper. The gas diffusion layer acts as a sponge to provide high concentrations of oxygen to the catalyst layer. In this manner, the rate of reaction at the cathode surface is no longer limited by mass transport of oxygen through water. The rate of reaction is therefore increased and is limited only by the rate of reaction at the catalyst surface/electrolyte interface. The use of the gas diffusion layer, together with oxygen gas or air, avoids the production of hydrogen gas and supports a high current density in the electrochemical cell.

It is important to recognize that the PTFE-impregnated carbon fiber paper is hydrophobic and therefore prevents saturation of the gas diffusion layer with water. Additionally, solubilized PEM may be brushed onto the front surface of a catalyst layer. By applying the PEM in intimate contact with the three dimensional catalyst surface, the oxygen reduction reaction can take place in all three dimensions. This three dimensional bonding is accomplished by hot pressing as previously described. This technique, however, requires temperatures near 220° C. which approaches the decomposition temperature of the perfluorinated sulfonic acid material.

It has been found that better fuel cell performance was obtained with M&E assemblies having thinner gas diffusion layers and active catalyzed layers. Through the use of electron micrographs, it was determined that the PEM having thickness of 125 μm in the dry state is reduced to an average of 40–50 μm after pressing. Non-uniform thickness in the PEM, gas diffusion layer and active catalyzed layer after hot pressing is seen to be caused by the multifiber containing weaves in the wet-proofed carbon cloth electrode backing material. The average thicknesses of the gas diffusion layer and the active platinum catalyzed layer for a carefully pressed M&E assembly are 40 μm and 25 μm, respectively. However, hot pressing M&E assemblies under optimum conditions with the carbon cloth backing material attached to the electrodes yields regions having very thin and highly effective gas diffusion and active catalyzed layers. Electron micrographs indicate that the carbon cloth material may not be suitable for the formation of layers having uniform thicknesses and, hence, for high performance M&E assemblies. An alternative electrode backing material with a smoother more uniform surface, such as porous carbon paper, may be more appropriate for fabricating M&E assemblies in conjunction with the hot pressing method.

Figure 11:
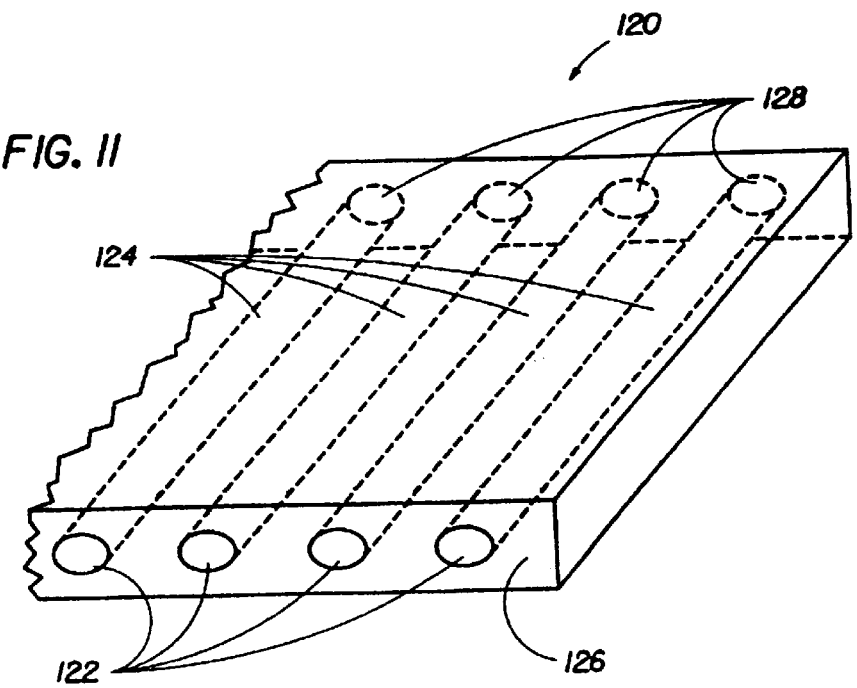
FIG. 11 is a perspective view of a portion of a membrane with internal passages.

The PEM membrane separating the anode and cathode serves the dual purposes of conducting protons and electronically insulating the electrodes. In order to have good conductivity for protons, the PEM must be kept moist. Thus it is necessary to hydrate the sulfonate sites on the polymer to allow for proton transfer through the membrane. The only method previously available for keeping the membrane moist was humidifying the oxygen gas source to the cathode (or hydrogen gas source to the anode, in the case of a fuel cell). However, the effectiveness of this method was limited. The present invention provides an alternative means of hydrating the membrane which includes the use of passages of approximately 1 to 9 mils diameter within the proton exchange membrane, as shown in FIG. 11. In this manner, water can be provided to the open ends 122 of the passages 124 along one edge 126 of the membrane 120 and delivered throughout the membrane 120 by capillary action. The water may even be circulated through the passages 124 and exit the membrane 120 at the open ends 128.

A PEM membrane with internal passages can be formed in a variety of ways. Briefly, the technique involves pressing ionically conducting material around a plurality of removable elements at sufficient temperature and pressure to fuse the material into a single membrane. After the material is fused, the elements are removed from the membrane to leave a passage for fluid flow. The removable elements may take any shape or form so long as the passages provide a substantially uniform flow of fluid throughout the entire membrane. The preferred removable elements are substantially parallel wires or tubes. However, it may be possible to form the passages around elements which are later removed through dissolution.

One method of providing a membrane with substantially uniform passages requires slipping a plurality of hollow tubes over a plurality of substantially parallel, removable elements and hot pressing. The preferred elements include niobium wire and polytetrafluoroethylene ("PTFE") tubing having a diameter of between about 0.005 and about 0.025 inches and which is no more than 2 mils smaller than the internal diameter of the hollow tubes. Perfluorosulfonic acid tubes suitable for use in the present invention are available from Perma-Pure, Inc., Tom's River, N.J.

Figure 12A:
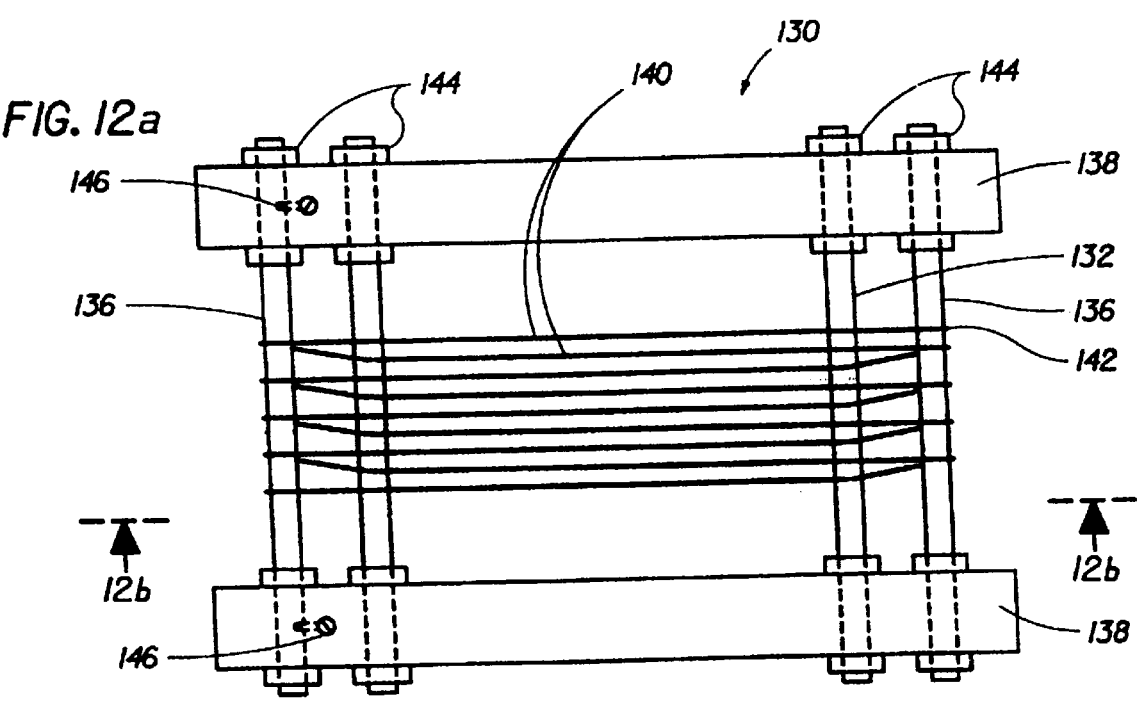
FIG. 12(a) is a schematic top view of a tensioning frame.
Figure 12B:
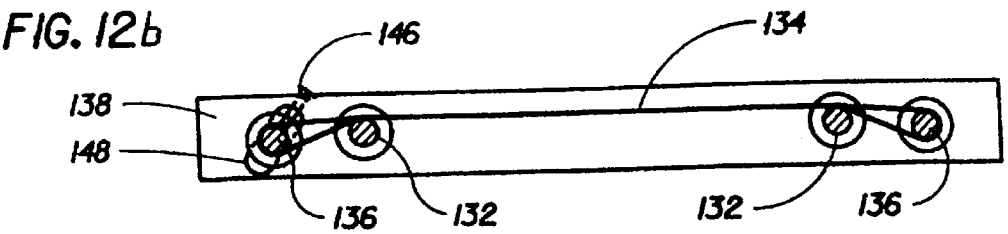
FIG. 12(b) is a schematic cross-sectional view of the tensioning frame in FIG. 12(a).

Referring now to FIG. 12(a), a tensioning frame 130 is shown that was designed for holding a series of tubes and/or removable elements tight and parallel during formation of a membrane with internal passages. This tensioning frame 130 has a pair of upper tensioning rods 132 having top surfaces lying in a common plane (shown best in FIG. 12(b) at line 134). The upper tensioning rods 132 are a sufficient distance apart to form a membrane therebetween, typically from about 3 to about 5 inches. A pair of lower tensioning rods 136 are separated by the upper tensioning rods 132 having top surfaces lying in or below the common plane of the upper tensioning rods 132. These two sets of tensioning rods are firmly held in position by two substantially parallel sidebars 138.

One end of a long string of tubing and/or removable wire or tubing 140 is tied to a lower tensioning rod 136, say at point 142. The string is then passed over the top of both upper tensioning rods 132 and around the other lower tensioning rod 136. The string is threaded back and forth in this fashion, positioning the tubes in side-by-side contact, until the tubes cover a planar area the size of the desired membrane, typically between a 3 inch by 3 inch square and a 5 inch by 5 inch square. However, the membrane may be formed or cut into any shape. Once the membrane has been formed, the membrane can be removed from the frame either by cutting the tubing and/or wires along both ends near the upper or lower tensioning rods, 132 or 136 respectively, or by disconnecting the rods 132 and 136 from one sidebar 138 by removing bolts 144.

The apparatus may also include means for adjusting the tension on a tubular membrane that is threaded over the tensioning frame. The tension is adjusted by moving (1) an upper tensioning rod upward or outward, and/or (2) a lower tensioning rod downward or outward. Typically, the rods are moved and the tubes or elements tightened by turning a set screw 146 in the sidebar 138 which puts a perpendicular force on the rod. It is preferred that the tensioning frame have only one adjustable rod and that the sidebars have a narrow slot 148 through which the rod can travel as the screw 146 is tightened.

A somewhat thicker membrane can be formed by placing a thin sheet of the PEM material above and/or below the hollow tubes before pressing. Alternatively, the material to be pressed may be two thin sheets placed on opposing sides of the removable elements without the use of tubes.

The membrane is pressed by first placing an aluminum block small enough to fit in the space inside the frame on the lower platen of the press and topping it with a silicone rubber load leveling pad and a release sheet, usually PTFE finished cloth. When one membrane is used, that membrane is placed on the release sheet. Next, the filled tensioning frame is placed with the tubes directly over the release sheet. If two membranes are being used, the second membrane is placed on top of the filled frame. In either case, this arrangement is topped with a second release sheet, a second leveling pad, and a second aluminum block. The press is then closed and the press cycle carried out.

Pressing of a PFSA membrane with internal passages is carried out at a pressure between about 380 psi and about 420 psi and temperature between about 150° C. and about 210° C. over a period of about one minute. The preferred conditions for pressing a PFSA membrane with PFSA tubes in the proton form is about 165° C. and about 400 psi. The preferred conditions for pressing two sheets of PFSA around PTFE elements without PFSA tubes are 200° C. and 400 psi. In either case, the removable elements are easily withdrawn after placing the membrane in deionized water.

A PEM membrane with internal passages can also be made with the thermoplastic sulfonyl fluoride precursor to PFSA. The pressing techniques are the same as with PFSA, except that the preferred pressing conditions include a pressure of about 400 psi and temperature of about 175° C. for a period of about 5 minutes. After pressing, the membrane is hydrolyzed with a 25% sodium hydroxide solution at 85° C. to release the membrane from the wires. The ionomer is then treated with an acid, such as sulfuric acid, to convert it to the proton form for use.

An alternative method for forming a membrane with internal passages involves the application of a recast film of ionically conducting material onto solid tubes and/or sheets of the same material. For example, a 5% solution of perfluorosulfonic acid, available from DuPont as NAFION, can be sprayed onto PFSA tubes and/or sheets using an air brush. The PFSA tubing or sheets should be preswollen with an ethanol water mixture, to match the shrinkage of the recast film to be deposited on it. Then the tubing is wound on a tensioning frame with each tube in side-by-side contact and a release surface placed immediately behind the tubes. It is preferred that five coats of the 5% PFSA solution be applied with 10 to 15 minutes drying time between coats. After the application of the last coat, the tubulated membrane is allowed to dry for several hours at room temperature. The dry membrane is then baked under nitrogen at 100° C. for about one hour to cure the recast material so that it does not return to solution when exposed to water.

Ionically conducting material suitable for use in proton exchange membranes of the present invention include fluorinated ion exchange membranes. Suitable fluorinated materials for use in such membranes include perfluorinated sulfonic acids, perfluorinated carboxylic acids, polymeric systems based on perfluoro bis-sulfonimides, polymeric systems based on perfluoro phosphonic acids, perfluorinated tetraalkylammonium salts, perfluorinated carbanion acids, carbanion acids, and mixtures thereof. It is preferred that the fluorinated ion exchange membrane have an equivalent weight in the range between 500 grams and 1200 grams.

When the ionically conducting material is a perfluorinated sulfonic acid, it can be advantageous to convert the perfluorinated sulfonic acid from the proton form to a psuedothermoplastic form prior to pressing, then to return the psuedothermoplastic to the proton form after removing the tubulating elements. Perfluorinated sulfonic acid containing material is converted to the psuedothermoplastic form by contacting the material with a tetraalkyl ammonium ion-containing solution such as tetrabutyl ammonium hydroxide. The benefit of pressing the membrane in the psuedothermoplastic form is that the elements can be more easily removed. The preferred conditions for pressing a PFSA membrane in the psuedothermoplastic form are a temperature of about 170° C. and a pressing pressure of about 400 psi.

While the pressing of membranes with internal passages capable of conducting fluids has been discussed as a distinct process that is separate from and prior to the hot pressing of membrane and electrode assemblies, it is also possible to combine the two processes into a single press step.

The press package is assembled in a manner analogous to that described for the pressing of membranes, except that the electrodes are positioned on either side of the membrane materials. The press conditions are determined by the configuration of membrane materials, as set out above. For example, when hot pressing a membrane and electrode assembly having two PFSA sheets around PTFE tubes, the preferred press conditions are to employ a pressure of about 400 psi at a temperature of about 200° C. for about one minute.

One further component which may be added to the press package for hot pressing is one or more gaskets positioned around the perimeter of the M&E assembly. The cathodic and anodic chambers of electrochemical cells of the present invention may be surrounded and sealed with gasket materials well known to one skilled in the art. Gasket materials can be selected from the group consisting of neoprene, silicone rubber elastomer materials, Viton, Kalrez, and urethanes. The elastic nature of these materials compensate for any contraction/expansion encountered in electrochemical cells of the present invention under various operating conditions. Because of the highly oxidizing aggressive environment encountered in the anodic side of electrochemical cells, gaskets will be selected from the group of fluorocarbon-based polymeric materials consisting of polytetrafluoroethylene (PTFE such as TEFLON, a trademark of Du Pont de Nemours, E.I. & Co.), chlorotrifluoroethylene, polytetrafluoroethylene containing organic or inorganic fillers, copolymer of tetrafluoroethylene and hexafluoropropylene (FEP), polyvinylidene fluoride (PVDF), and fluorocopolymers containing vinylidene fluoride and hexafluoropropene. This complex assembly is then ready for installation in an electrolytic cell.

The structure of a cell comprising one or more M&E assemblies, each M&E assembly sealed with gaskets, may be held together with metal end plates. The end plates may be secured together by a plurality of tie rods and a plurality of nuts. The metal end plates may be made of a metal including, without limitation, iron, nickel, copper, aluminum, stainless steels, other corrosion-resistant alloys such as those sold by Inco Alloys International, Inc., Huntington, W. Va., under the trademark MONEL (predominantly nickel and copper, and containing small percentages of carbon, manganese, iron, sulfur, silicon, aluminum, titanium, and cobalt), and under the trademark INCONEL (predominantly nickel and chromium, and containing varying percentages of iron, carbon, copper, manganese, silicon, titanium, columbium, aluminum, cobalt, and tantalum) or Haynes International Inc. of Kokomo, Ind. under the trademark HASTELLOY (predominantly nickel and containing varying percentages of chromium, manganese, iron, copper, cobalt, titanium, aluminum, carbon, tungsten, and molybdenum), titanium, tantalum, hainium, niobium or zirconium. The preferred metal is titanium. The surfaces of the end plates may include a surface metallic coating of a group III metal. The preferred group III metals include platinum, gold, palladium, ruthenium and iridium. The metallic coating may be applied by plating, vapor deposition, or other coating techniques known in the art.

One aspect of the invention relates to techniques and methods of avoiding the reduction in the diameter of the passages in the membrane, which may occur during the pressing of the M&E assemblies, or during the securing of the gaskets and/or endplates to the cell. As described above, it may be necessary to apply substantially high pressure to secure the membrane and the electrode assembly. Compression by application of high pressure may also be required when the anodic and/or the cathodic chambers of the electrochemical cell are surrounded with gaskets to seal the cell. Further, securing the M&E assemblies between the end plates may also involve subjecting the assembly to additional compression. Thus, the flow of aqueous solutions through the internal channels may be decreased or completely stopped by the reduction in the diameter of the passages, particularly at the edges of the assembly where high compression may lead to total collapse of the passages.

Reduction in the diameter of the passages may be avoided by strengthening the walls of the channels of the membranes of the invention, in the sections that are subjected to high compression. The invention provides a membrane having internal channels with enhanced structural integrity. The walls of the channels in the membrane may be enhanced by adding small tubes that may be permanently placed within the internal channels, in the membrane, at locations that may be subjected to high compression during the assembly of the electrochemical cell.

The invention also provides a method of fabricating a membrane with substantially uniform passages comprising placing a plurality of permanent hollow tubes over a plurality of substantially parallel, removable elements and hot pressing. The preferred removable elements include niobium wire and polytetrafluoroethylene ("PTFE") tubing having an outer diameter between about 0.005 and about 0.025 inches, and which is no more than 2 mils smaller than the internal diameter of the hollow tubes.

The permanent tubes may be made of non-conductive, inert material, capable of sustaining the compression usually required in assembling and/or operating electrochemical cells used in electrolyzers, and such electrochemical devices. The preferred material for the permanent tubes is polytetrafluoroethylene (PTFE such as TEFLON). The permanent tubes are preferably placed at one or both ends of each passage in the membrane.

Figure 19:
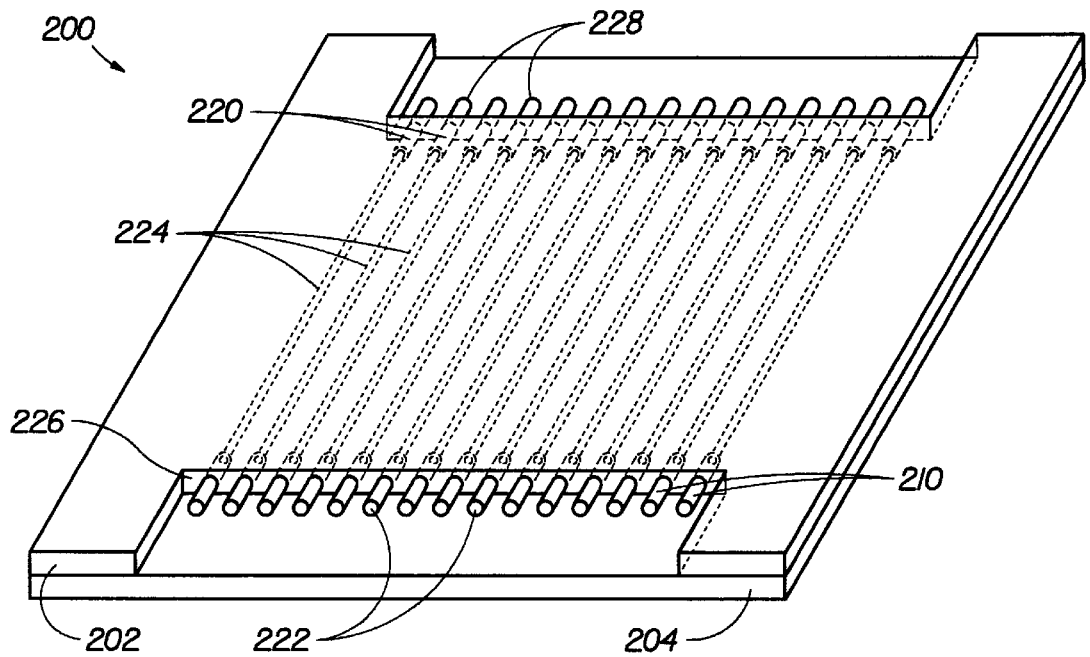
FIG. 19 is a perspective view of a membrane with internal passages and permanent tubes.

FIG. 19 is a perspective view of a membrane with internal passages and permanent tubes. In operating a cell comprising the membrane 200, water may be provided to the open ends 222 of the passages 224 connected to the permanent tubes 210 which are extended along one edge 226 of the membrane 200. The water may be circulated through the passages 224 and exit the membrane 200 at the open ends 228 of the permanent tubes 220. The passages are substantially open and unobstructed to allow for fluids to flow freely through the passages.

The membranes of the present invention with parallel internal passages and permanent tubes may be formed using an apparatus comprising, a pair of upper tensioning rods in a spaced relation having top surfaces lying in a common plane, a pair of lower tensioning rods separated by the upper tensioning rods having top surfaces lying in or below the common plane of the upper tensioning rods, and means for securing each of the tensioning rods. A removable element may be repeatedly wound over the pair of upper tensioning rods and around one of the lower tensioning rods. A set of two small permanent tubes may be inserted over the ends of each removable element.

Figure 20:
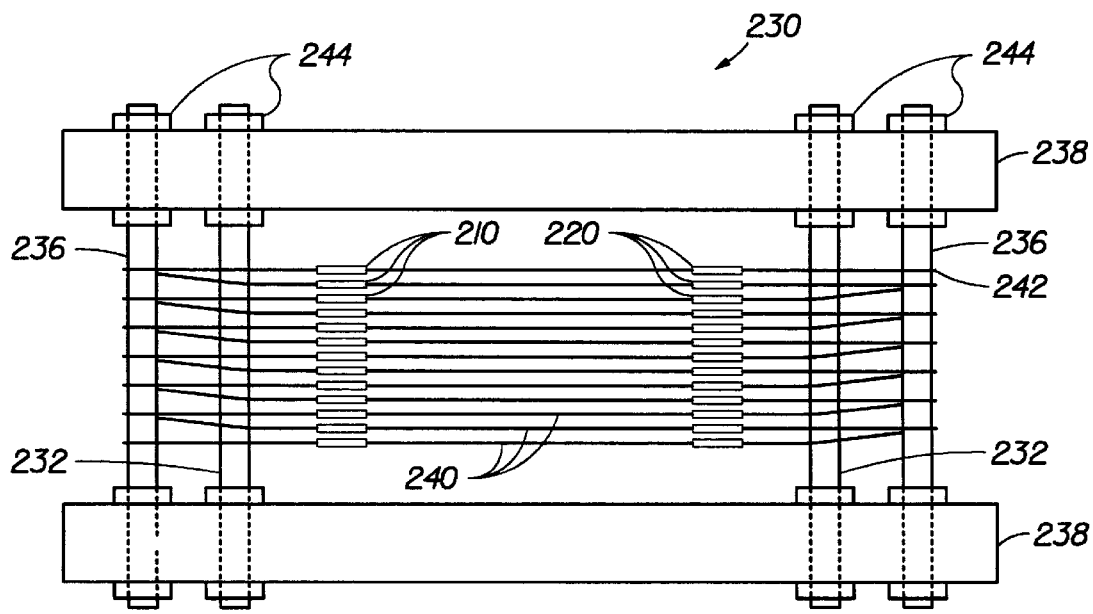
FIG. 20 is a schematic top view of a tensioning frame containing both the removable elements as well as the permanent tubes.

FIG. 20 is a schematic top view of a tensioning frame containing both the removable elements and the permanent tubes. FIG. 20 presents a tensioning frame 230 adequately designed for holding a series of permanent tubes and/or removable elements tight and parallel during the formation of a membrane with internal passages and permanent tubes. The tensioning frame 230 has a pair of upper tensioning rods 232 having top surfaces lying in a common plane. The upper tensioning rods 232 are a sufficient distance apart to form a membrane therebetween, typically from about 3 to about 5 inches. A pair of lower tensioning rods 236 are separated by the upper tensioning rods 232 having top surfaces lying in or below the common plane of the upper tensioning rods 232. These two sets of tensioning rods are firmly held in position by two substantially parallel sidebars 238.

One end of a removable element 240 containing two small permanent tubes 210 and 220 is tied to a lower tensioning rod 236, say at point 242. The dimensions of the permanent tubes 210 and 220 are preferably 1 cm long, and have a 0.1 cm outer diameter, with an internal diameter big enough to allow the insertion of the removable element 240. The removable element is then passed over the top of both upper tensioning rods 232 and around the other lower tensioning rod 236. The removable element is threaded back and froth in this fashion, each removable element 240 containing two small permanent tubes 220 and 210, until the tubes cover a planar area the size of the desired membrane, typically between a 3 inch by 3 inch and a 5 inch by 5 inch square. However, the membrane may be formed or cut into any shape. Before forming the membrane, the permanent tubes 210 in each removable element 240 are aligned, so that a permanent tube 210 in one removable element 240 is placed side-by side to other permanent tubes 210 on adjacent removable elements 240. The permanent tubes 220 are also arranged so that tubes 220 on adjacent removable elements are positioned side-by-side. In each removable element 240, the distance between any two permanent tubes 210 or 220 on the same removable element 240 is adjusted at about 0.2 to 1 cm, preferably 0.5 cm. In any case, it is preferred that the distance between the tubes on removable elements be smaller than the length of the electrode to be positioned on the membrane. Once the membrane has been formed, the membrane can be removed from the frame either by cutting the removable elements along both ends near the upper or lower tensioning rods 232 or 236 respectively, or by disconnecting the rods 232 and 236 from one sidebar 238 by removing bolts 244.

As indicated above, electrodes may be added to the tubulated membrane after the tubulated membrane is fabricated and before the removable elements are removed. For example, for the fabrication of M&E assemblies containing thin film electrodes (e.g. catalyst ink decal electrodes) the ink electrode may be applied to one or both sides of the tubulated membrane after the membrane has been hot pressed. The membrane assembly may still be in the frame, or be removed from the frame. In either case, the removable elements should be still present in the membrane assembly. After the ink is dried, hot pressing may be applied (for example, between 100 and 200° C., preferably at 150° C., and between 10 and 250 psi, preferably at 100 psi).

Electrodes may also be added to the tubulated membrane after the tubulated membrane is fabricated and the removable elements are removed. Electrodes may be cold pressed to the tubulated membrane by assembling the sandwich structure (i.e. electrode/tubulated membrane/electrode) between two end plates.

FIGS. 21(a–b) are top and perspective views, respectively, of an assembly comprising an electrode, a gasket, and a membrane with internal passages and permanent tubes. The internal passages 256 were formed between two proton exchange membranes (a top membrane 252 and a bottom membrane 254) by extracting the removable elements 240 (shown in FIG. 20.) The permanent tubes 210 connect the internal passages with the port 264. An electrode 268 is placed on each side of the tubulated membrane. Different physical and chemical approaches may be used to place the electrodes on both sides of the tubulated membrane. For example, the electrodes may be bonded by hot pressing, or attached by cold pressing. Also, thin film electrodes may be fabricated by applying an ink containing a mixture of the catalyst and NAFION dissolved in a water/alcohol solution on the membrane.

Figure 22:
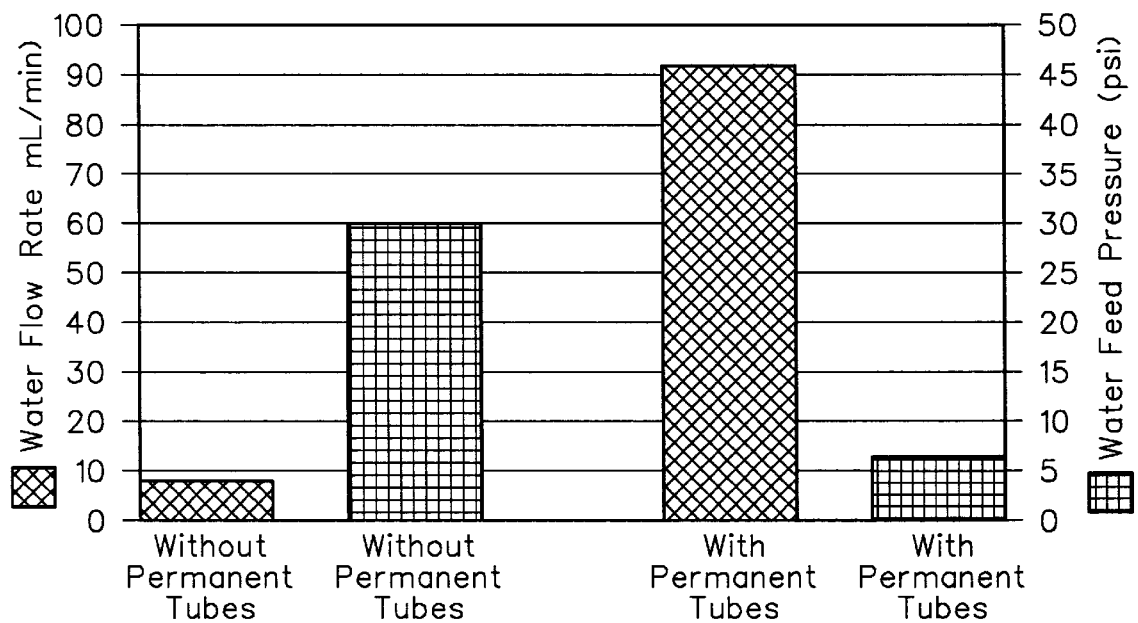
FIG. 22 is a chart reporting the water flow rates and the pressure drop for a membrane/electrode assembly containing internal passages with and without permanent tubes.

FIG. 22 is discussed below with reference to Example 6.

Figure 23:
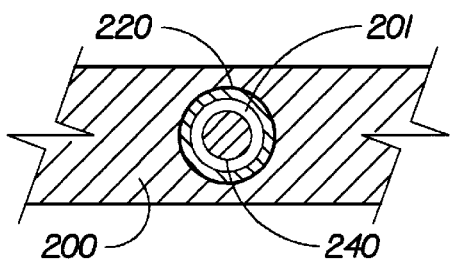
FIG. 23 is a cross-sectional view of a membrane with removable elements in place.

FIG. 23 is a crossectional view of a membrane 200 with the removable element 240 in place. The permanent tube 220 is surrounded on its outer surface by the membrane 200 and preferably, part of the inner surface is also covered by a portion of the membrane material indicated generally as 201.

Figure 26:
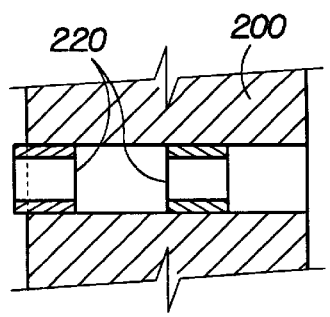
FIG. 26 is a cross-sectional view of a membrane having one or more passages formed with one opening.

Alternatively, one or more of the passages in the membrane can be formed with one opening. (See FIG. 26) The membrane is made according to the method disclosed above. Once the removable elements are taken out, one edge of the membrane that corresponds to the openings of the passages can be sealed by conventional means such as crimping or hot pressing. The compression resistant means 220 can also be coupled to the membrane near the open end of the passage.

Figure 24:
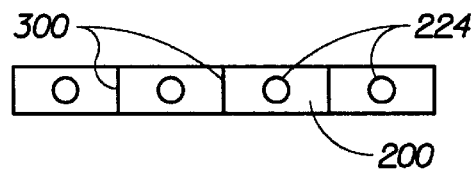
FIG. 24 is a cross-sectional view of an alternative compression resistant means.

Alternatively, the compression resistant means can be a support structure 300 positioned in a plane normal to the sheet surfaces as illustrated by FIG. 24. The support structures can be small sections of PTFE or like material coupled to the membrane between the passages. The support structures can protrude from the membrane, but it is not necessary that they do so. The support structures can be placed anywhere in or on the membrane that may be subjected to high amounts of compression.

Figure 25:
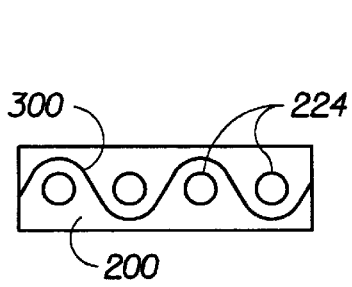
FIG. 25 is a cross-sectional view of yet another compression resistant means in the form of a resilient strip.

The compression resistant means may also be in the form of a resilient strip that can be positioned between the passages and around the passages as shown in FIG. 25.

Figure 27:
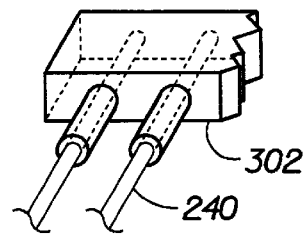
FIG. 27 is a perspective view of a solid structure comprising of plurality of compression resistant members.

The membrane may also be formed using end pieces in the form of a solid structure that the membrane is then formed around. (See FIG. 27) The end pieces can have holes extending through them for receiving the removable elements. For example, the rigid tubes, spring or support structure can be a part of a solid end piece that has holes formed in it so as to provide fluid communication with the passages once the membrane is formed. There can be a complementary second solid end piece that holds the removable elements and a second compression resistant means. The membrane could then be formed as above and the removable elements pulled through the holes formed in the end piece. Then the membrane would be ready for use. In this design the compression resistant members near the edges of the membrane may not be necessary if the solid end piece is used in the construction of the membrane electrode assembly.

Figure 21A:
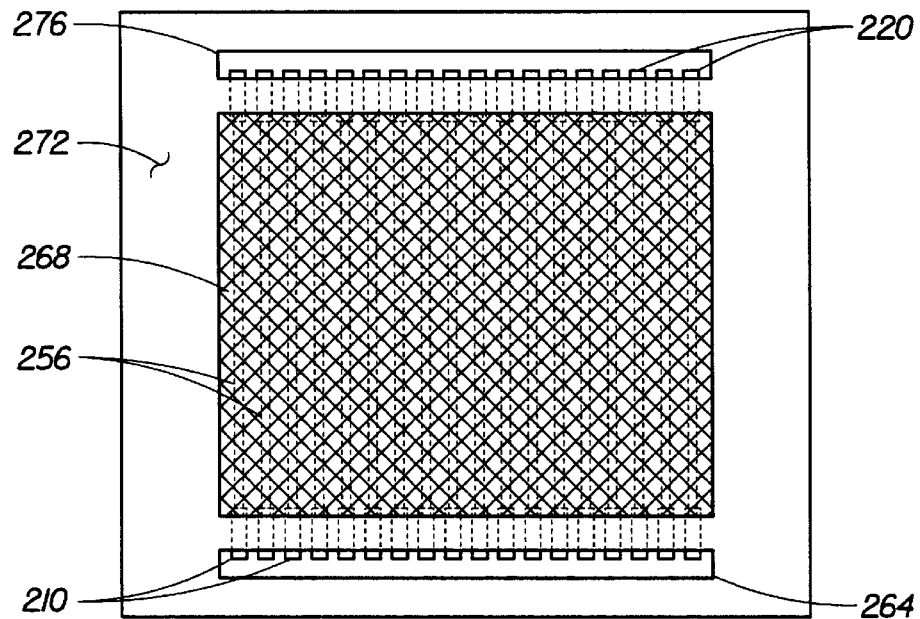
FIGS. 21(a–b) are top and perspective views, respectively, of an assembly comprising an electrode, a gasket, and a membrane with internal passages and permanent tubes.
Figure 21B:
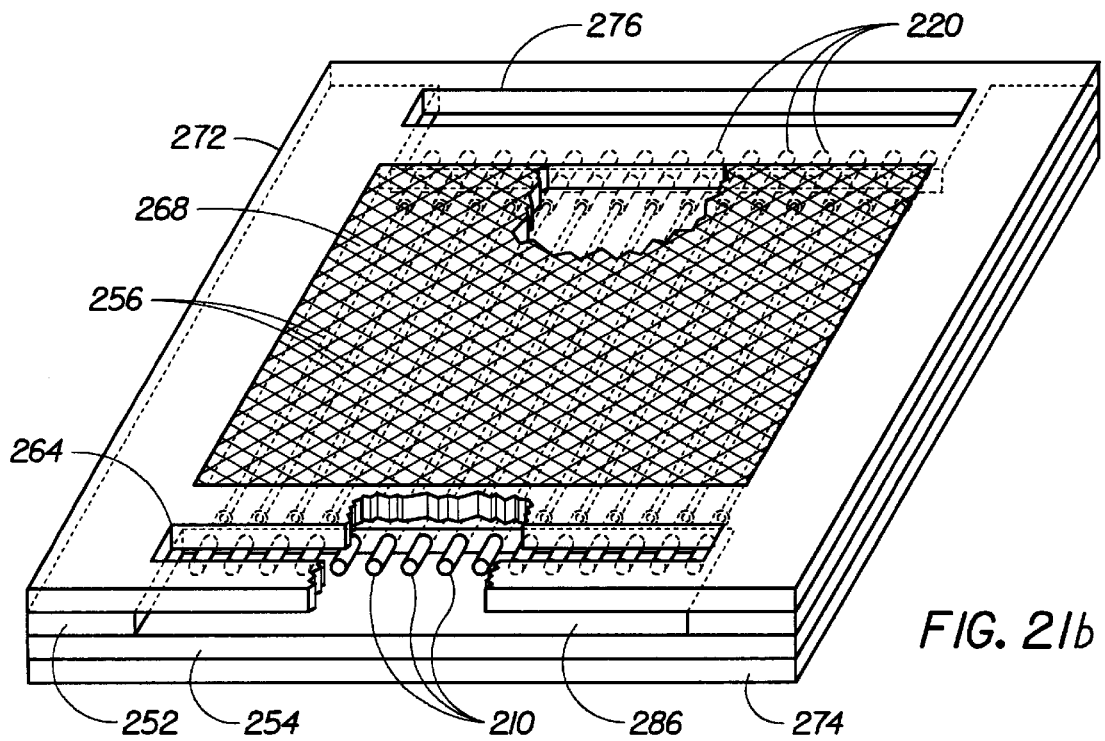

As shown in FIGS. 21(a) and 21(b), non-conducting gaskets 272 and 274 are placed on either side of the tubulated membrane. The gasket 272 has three cutouts: one to fit around the perimeter of the water input port 264, another to fit around the perimeter of the water output port 276, and another to fit around the perimeter of the electrode 268. The gasket 274 has one cutout that fits around the perimeter of the electrode. The gaskets should have a thickness greater than that of the electrodes so that they may be sufficiently compressed to seal liquids and/or gases.

The top membrane 252 is cut around the permanent tubes to allow the exposure of the permanent tubes to the water ports 264 and 276. Before the top gasket 272 is placed on the top of the tubulated membrane, a filling material 286 (e.g. silicone) is placed on the area to be covered by the top gasket 272, especially around the water ports 264 and 276. The filling material may be mixed with a stronger material, e.g., sand or glass beads, to provide strength to the area coated with the filling material.

The permanent tubes 210 and 220 should preferably be placed from a point two millimeters inside the electrode perimeters to about two millimeters inside the water port. This position of the permanent tubes protects the internal passages from collapsing, mainly due to the pressure applied through the gasket placed between the perimeter of the water port and the perimeter of the electrode. The permanent tubes are positioned in fluid communication with the passage and also positioned near the ends of the passage and/or between the ends of the passage, depending on where the pressure is applied.

Providing fluid access directly to the membrane: (1) improves humidification in fuel cells and other all gas phase systems, (2) allows the direct feed of water to the active region in electrolyzers, and (3) allows the direct feed of reactants to the active region in other electrochemical devices. In fuel cells, the use of internal hydrating continuous channels permits the elimination of the humidifier section of a standard fuel cell stack or of the need for an external humidifier. The elimination of humidifiers affords a substantial reduction in the system size and weight, and permits the use of more heavily wet-proofed gas diffusion electrodes which offer better resistance to electrode flooding. In electrolyzers, the volume of water that must be removed from the exit gas streams is drastically reduced. In other electrochemical devices, direct feed of required reactants to the membrane allows for a simpler system.

An essential requirement of all ozone electrolysis processes is to operate at high current densities, because the efficiency of ozone generation is low at low current densities. At higher current densities, a higher proportion of the electrical current drives the ozone formation reaction at the expense of competing or side reactions forming oxygen.

The economics of ozone electrolysis systems dictate the need for operation at high current density, because (1) the energy cost per unit amount of ozone generated is at a minimum and (2) the size of the electrodes, which determines the overall equipment cost, required to generate a given amount of ozone will be at a minimum when operating at high current densities where the efficiency of ozone formation is the greatest.

Figure 8:
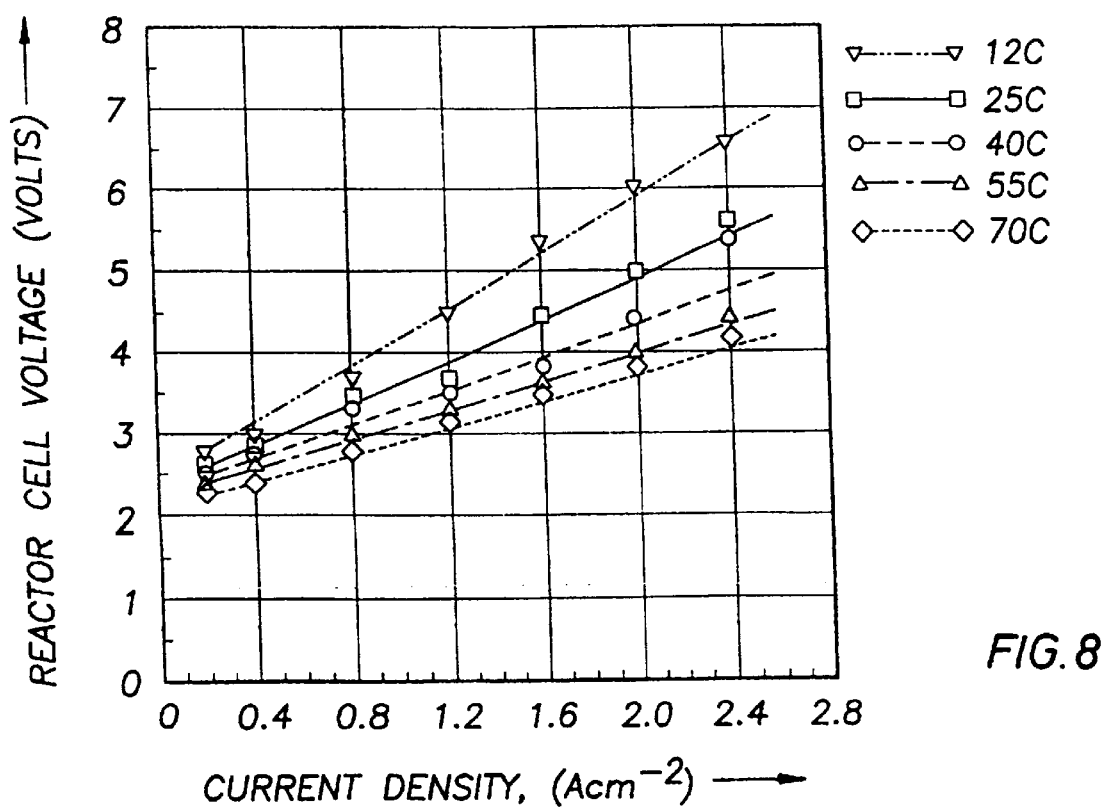
FIG. 8 is a chart showing the variation of cell voltage with current density for the air depolarized ozone electrolysis cell of FIG. 1.

The dependence of the electrochemical reactor voltage on current density for various reactor temperatures is shown in FIG. 8. Cell voltages were recorded 30 minutes after applying each current density value to allow steady state condition to be reached. The reactor temperature was measured by a thermocouple probe located in the titanium end plate. The cell voltage increased linearly with increasing current density and decreased with increasing temperature at any selected applied current density. The variation of ozone current efficiency with reactor temperature for a number of current densities is given in FIG. 9. Current efficiency is the proportion of the current supplied to the cell that goes toward the desired product ozone ($O_3$). Current efficiency was determined by first finding the ideal yield if all the current goes to ozone production. The value of the ideal yield was then compared with the actual ozone yield. The relationship given below is used to determine the ideal yield:

$$\frac{i \times t}{n \times F} = \text{yeild in moles of ozone produced assuming 100\% Coulombic efficiency} \quad \text{EQUATION (6)}$$

where:
i is the cell current in amps;
t is the time of electrolysis in seconds;
n is the number of electrons taking part in the reaction; and
F is the Faraday constant (96,484 Coulombs).

Figure 9:
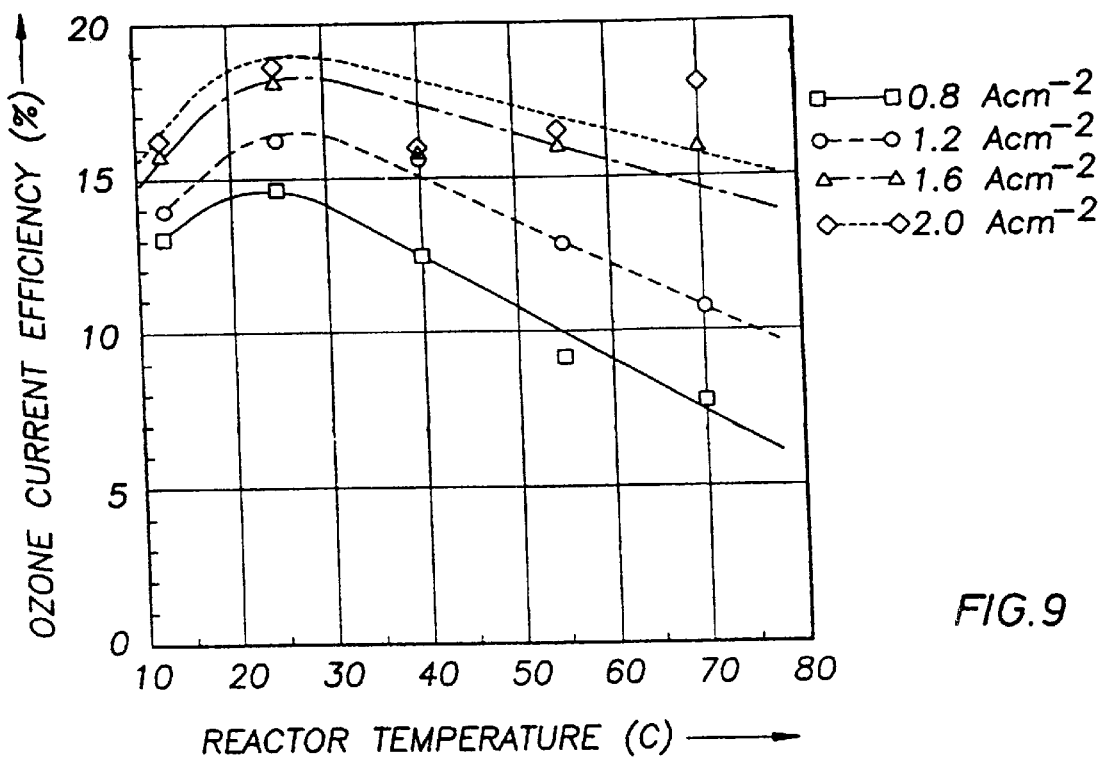
FIG. 9 is a chart showing the variation of ozone current efficiency with electrochemical reactor temperature for the air depolarized ozone electrolysis cell of FIG. 1.

The current efficiency versus temperature profiles go through a maximum at approximately room temperature for all current densities. The profiles presented in FIG. 9 show that the current efficiency maximizes at 18 to 19 percent on operating the electrochemical reactor at a current density of 1.6 to 2.0 amps per square centimeter and a temperature of 25° C.

The DC electrical energy requirement (J) for ozone production in kilowatt hours per kilogram (kWh/kg) of ozone is given by the following equation (7):

$$J = \frac{E \times n \times F}{3600 \times N \times M} \quad \text{EQUATION (7)}$$

where:
E is the cell voltage;
n is the number of electrons released per mole of ozone formed (6);
N is the current efficiency; and
M is the molecular weight of ozone (48 grams).

As can be seen from the above figures, the reaction rate, ozone current efficiency and conductivity of the PEM electrolyte are dependent upon temperature. Temperature is typically controlled by the circulation and heat exchange of the water flowing to the anode.

One advantage of the electrochemical methods of the present invention is the ability to provide paired synthesis or paired electrosynthesis. The term "paired synthesis" means that the product generated at both the anode and cathode may be used together in a common application. For example, the present invention allows for selective generation of hydrogen peroxide, $H_2O_2$, at the cathode and generation of ozone, $O_3$, at the anode. Both of these products may be collected together and used in various applications, such as the treatment of waste water streams. Therefore, the process can generate twice as much oxidant product as was possible in prior art devices.

According to the present invention, an electrochemical cell for the production of ozone may be constructed by placing a proton exchange membrane between an anode and a cathode. The cathode may be coated with a semi-hydrophobic catalyst material supported on a layer of carbon paper fiber impregnated with a sintered mass derived from fine carbon powder and Teflon emulsion. The anode is exposed to a source of water and the gas diffusion cathode is exposed to oxygen gas or air. An external electrical circuit is necessary to provide electron flow from the anode to the cathode, while the PEM provides for proton flow. Also, the electrochemical cell must provide a means for collecting the produced ozone.

The present invention also encompasses the use of a multiple cell arrangement, otherwise referred to as a "filter press arrangement." This arrangement stacks individual cells back to back, in series, so that the current or electricity flows through one cell to the next. Each cell is separated by a bipolar plate which allows the electricity from the anode of a first cell to pass through to the cathode of a second cell. Each cell must also be provided with a source of water to the anode surface and a source of oxygen gas to the gas diffusion cathode. These requirements of the present invention may be accomplished through numerous embodiments. The preferred embodiment for carrying out the method of the present invention is disclosed as follows:

Referring to FIG. 1, a cross-sectional side view of a depolarized ozone electrolysis cell 10 is shown. A proton exchange membrane (PEM) or a solid polymer electrolyte (SPE) 12, such as a perfluorinated sulfonic acid polymer, is disposed in the center of the cell. Bonded to one side (the cathodic side) of the solid electrolyte 12 is the electronically conducting, semi-hydrophobic, oxygen reduction electrocatalyst layer 14 of the gas diffusion cathode. This electrocatalyst layer 14 may be comprised of Teflon-bonded platinum black or carbon-supported high surface area platinum. The gas diffusion layer 16 of the gas diffusion electrode is integrally formed onto the catalyst layer 14.

On the other side (the anodic side) of the solid electrolyte 12 is an anode made up of a catalyst layer 18 formed on a substrate 20. The electronically conducting, hydrophilic, ozone forming electrocatalyst layer 18 is made of lead dioxide ($PbO_2$) or a platinum-tungsten alloy (Pt/W). The substrate 20 is a porous, non-corroding, electronically conducting support material that is preferred to be fabricated using sintered titanium (or tantalum) particles.

Two non-conducting gaskets 17 and 21 are placed on either side of the solid electrolyte 12. The gaskets 17 and 21 have cutouts to fit around the perimeter of the cathodic gas diffusion electrode and the anodic substrate 20, respectively. The gasket should have a thickness greater than that of the cathodic gas diffusion electrode and the anodic substrate 20 so that it may be sufficiently compressed to seal liquids and/or gases.

A cathodic depolarizer, typically a gas such as oxygen, enters the cell through port 22 which is in fluid communication with a series of channels 24 for fluid flow to the gas diffusion layer 16 of the cathode. The depolarizer gas and the products generated, such as liquid hydrogen peroxide, flow out of the cell 10 through port 26. The depolarizer flow is typically downward across the cathode so that the liquids generated can more easily be removed from the cell.

In a similar manner, water is fed into the cell 10 for exposure to the anode electrocatalyst layer 18 through port 28. The water flows through the channels 30 and out the port 32. The water flow is typically directed upward across the anode so that gaseous oxidation products do not become trapped in the cell.

The structure of the cell 10 is held together with two metal end plates 34 and 36. The end 4 plates 34 and 36 are secured together by a plurality of cell tie rods 38 having male threads and a plurality of nuts 40. To keep the endplates 34 and 36 electrically isolated from each other, a plurality of electrically insulating sheaths 42 and washers 44 are used in conjunction with each rod 38 and nut 40, respectively. Having electrically isolated the endplates 34 and 36, a positive terminal or busbar 46 and a negative terminal or busbar 48 can be connected to a DC power source (not shown).

Figure 2:
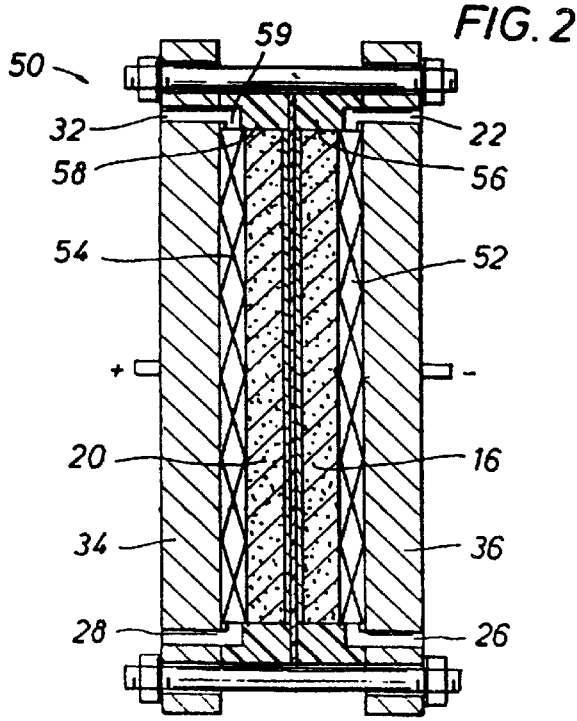
FIG. 2 is a cross-sectional side view of a second embodiment of a depolarized ozone electrolysis cell.

Referring now to FIG. 2, a second embodiment of the present invention is shown. The electrochemical cell 50 is substantially similar to the cell 10 of FIG. 1, except that the channels 24 and 30 (shown in FIG. 1) have been substituted with non-corroding, electronically conducting, metal matrices 52 and 54, respectively. The metal matrix includes either an expanded metal sheet, a metal wire mesh or a metal foam. The metal matrices 52 and 54 still allow flow from port 22 to port 26 and from port 28 to port 32, respectively, but provide a more turbulent flow pattern and leave a greater portion of the electrode surface area exposed to fluid flow. Also note that the gaskets 56 and 58 have a compressed width equivalent to the anodic substrate 20 plus the metal matrix 54 or the cathodic gas diffusion electrode plus the metal matrix 52. A slot 59 has been cut in the gasket to allow flow from between the ports.

Figure 3:
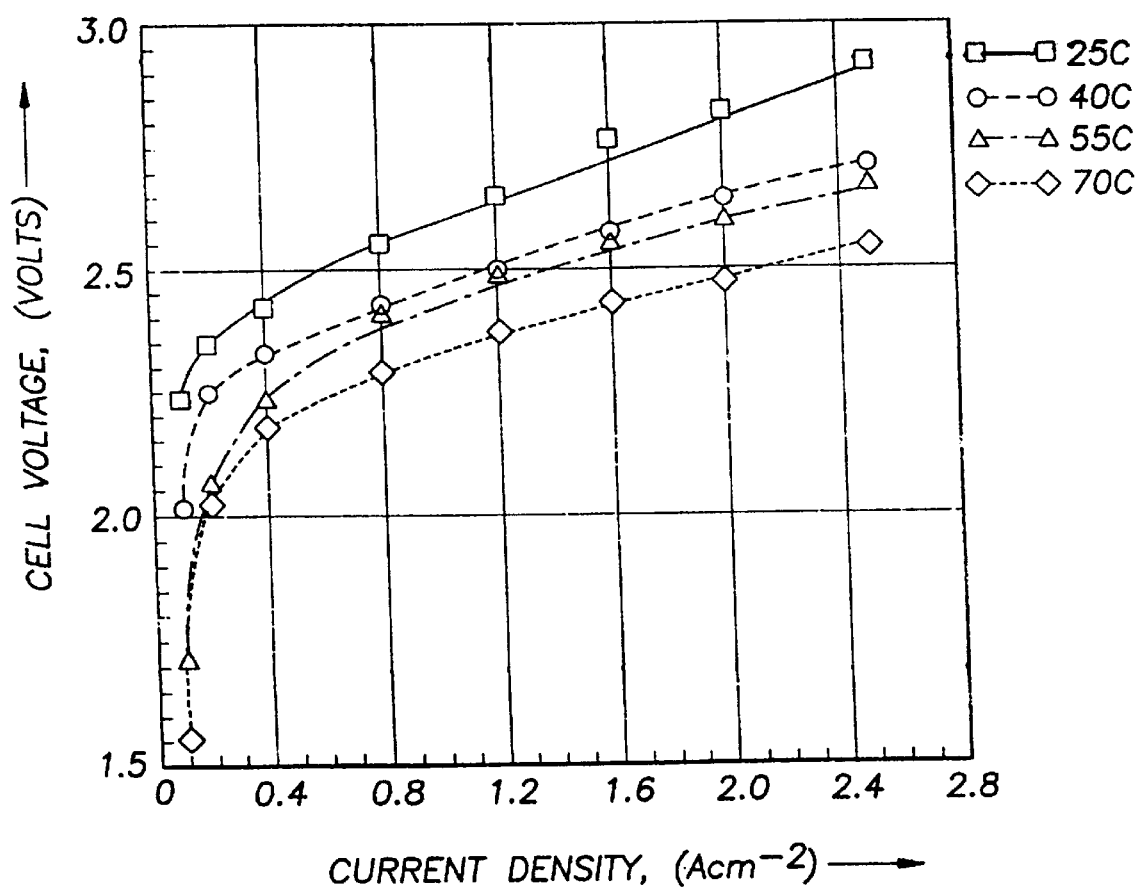
FIG. 3 is a chart showing the variation of cell voltage with current density for the oxygen depolarized ozone electrolysis cell of FIG. 2.

Now referring to FIG. 3, the variation of electrochemical cell voltage with current density applied to the anodic and cathodic electrodes of the cell represented schematically in FIG. 2 is illustrated. It can be seen from the curves depicted in FIG. 3 that the cell voltage decreases with increasing cell temperature for any given applied current density. In obtaining the data represented by FIG. 3, pure oxygen gas, as a cathodic depolarizer, was fed into the cathode chamber of the cell represented schematically in FIG. 2 under a pressure of 40 psi. At the same time, water was recirculated over the anode surface under atmospheric pressure. The low cell voltages obtained on using oxygen gas as a cathodic depolarizer give rise to a considerable improvement over the corresponding cell voltages described in the prior art.

Figure 4:
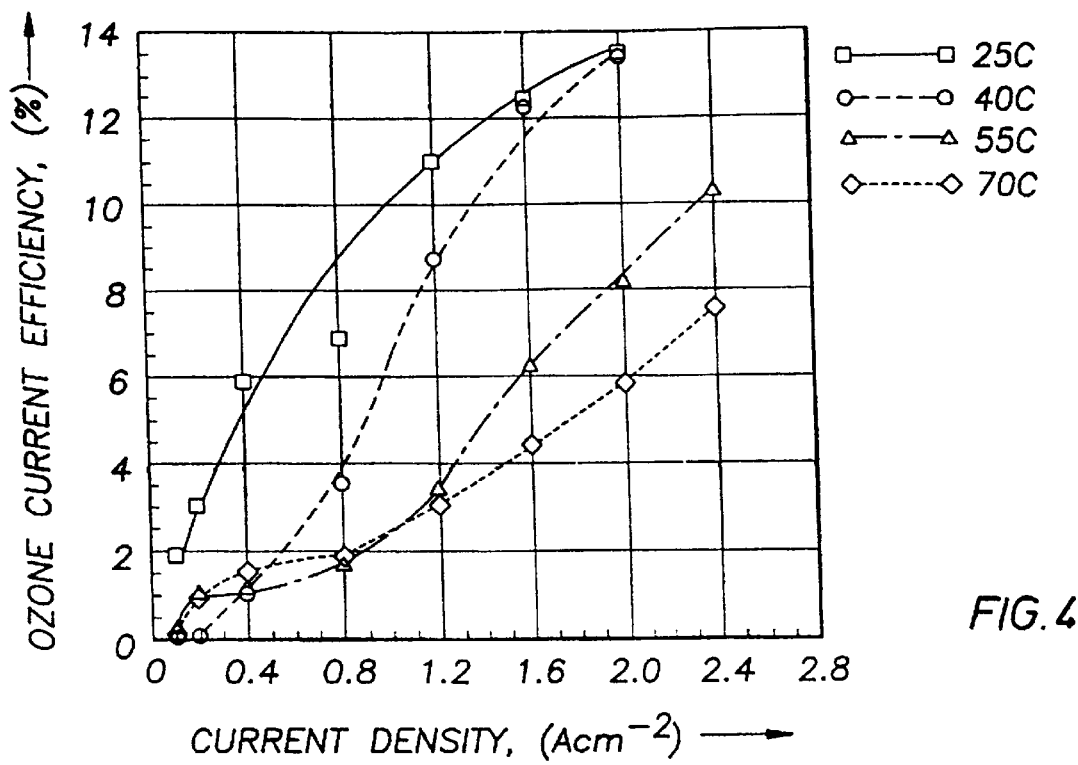
FIG. 4 is a chart showing the variation of ozone current efficiency with current density for the oxygen depolarized ozone electrolysis cell of FIG. 2.

Now referring to FIG. 4, the dependence of ozone formation current efficiency on the current density flow from the anode and cathode of the cell represented schematically in FIG. 2 is illustrated. Relatively high current efficiencies are achieved at high current densities, a situation which normally gave rise to high cell voltages in prior art devices. However, with the present invention, the use of a cathodic depolarizer, such as oxygen gas, enables relatively high current densities to be attained at lower cell voltages. High ozone current efficiencies are desirable so as to make the apparatus as compact and as efficient as possible.

Figure 5:
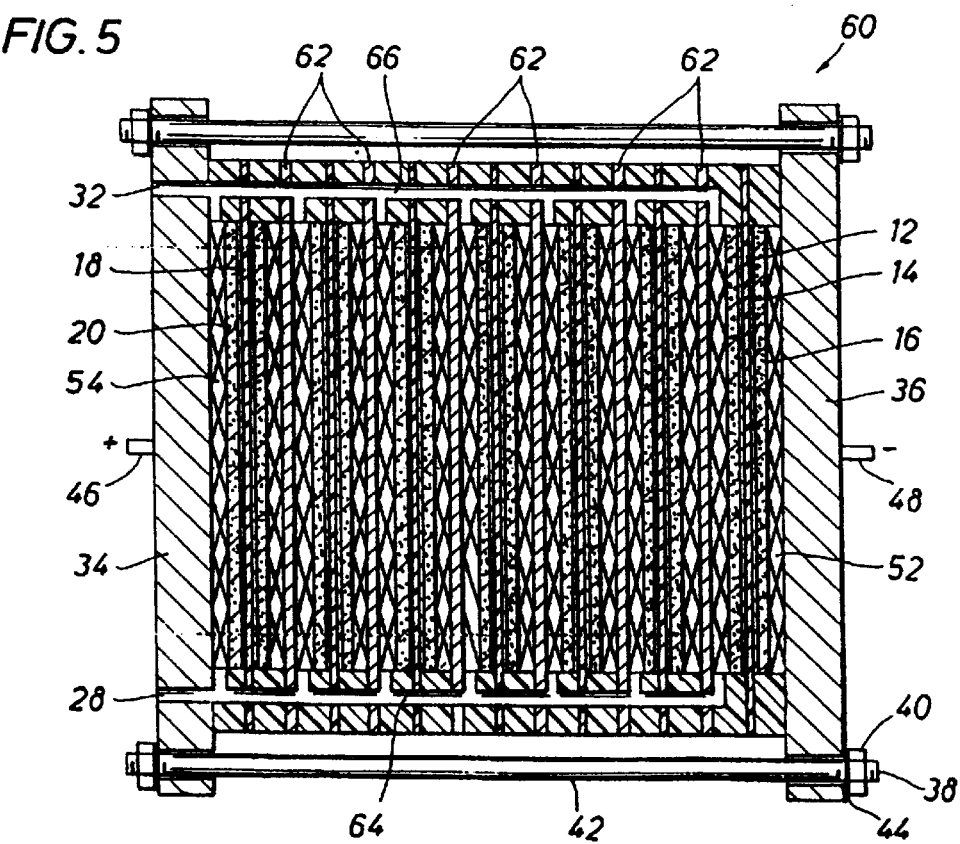
FIG. 5 is a cross-sectional view of a multiple cell arrangement of the depolarized ozone electrolysis cell of FIG. 2 where the cells are electrically connected in a series circuit.

Now referring to FIG. 5, a cross-sectional view of a multiple cell arrangement 60 of the depolarized ozone electrolysis cell of FIG. 2 is shown, where the cells are electrically connected in series. The same numbering system as used in FIG. 1 and FIG. 2 has been incorporated into FIG. 5. Accordingly, FIG. 5 shows seven electrochemical cells separated by six bipolar plates 62. The bipolar plate 62 of the present invention can be made from valve metals such as titanium, tantalum, hafnium, zirconium or from the stainless steels including SS304, SS316 and other high chromium/nickel-containing alloys. The bipolar plate can be of any thickness provided they effectively isolate each cell. Preferred thicknesses are in the range of 0.2–2.0 mm (8–80 mils). Both flat surfaces of the bipolar plate may be plated with a thin layer of a noble metal such as platinum, gold, palladium, iridium, or alloys thereof. The bipolar plate has sections beyond the perimeter of the anode and cathode removed for internal manifolding to allow fluid flow between adjacent cells.

The inlet port 28 and outlet port 32 are now in communication with inlet manifold 64 and outlet manifold 66, respectively, where the manifolds 64 and 66 comprise a series of slots cut into the gaskets. In this manner, water is delivered to the anode 20 of each individual cell of the multiple cell arrangement 60 via manifold 64, by flowing through the metal matrix 54 of each individual cell. The water is then collected in manifold 66 and removed through port 32. A similar manifold system for the cathode is positioned 90 degrees to that shown for the anode.

Figure 6:
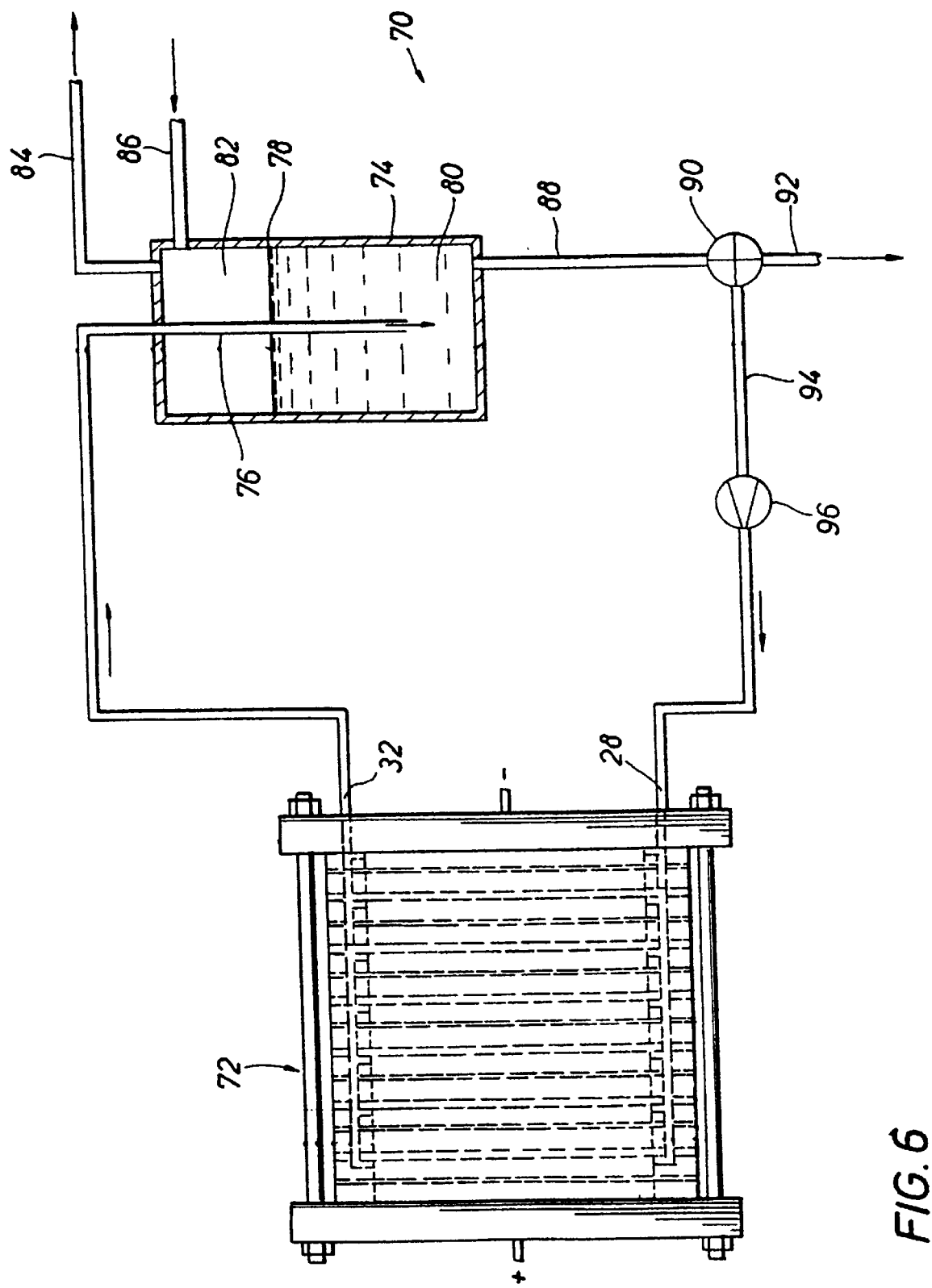
FIG. 6 is a schematic diagram of the apparatus of FIG. 5 in combination with ancillary equipment for the electrochemical production of ozone gas and/or ozonated water.

FIG. 6 shows an apparatus 70 for carrying out a process for the electrochemical production of ozone gas and/or ozonated water. An electrochemical cell 72 is used for the production of ozone from water according to the apparatus of FIG. 5. Water is input to the cell 72 through port 28 and is removed through port 32, as described previously. The water exiting port 32 contains entrained ozone gas produced in cell 72. The ozone-laden water flows into a gas/liquid separator tank 74 via pipe 76. The ozone then disengages from the water 80 and rises into the vapor space 82 of tank 74. The ozone is removed from space 82 through outlet pipe 84. Makeup deionized water may be added to the tank 74 through pipe 86.

The water 80 is withdrawn from tank 74 through pipe 88. The water in pipe 88 may be either discarded by directing flow through valve 90 to pipe 92 or recycled by directing flow to the recycle line 94. The recycle line 94 passes through a pump 96 before feeding the water into port 28.

Figure 7:
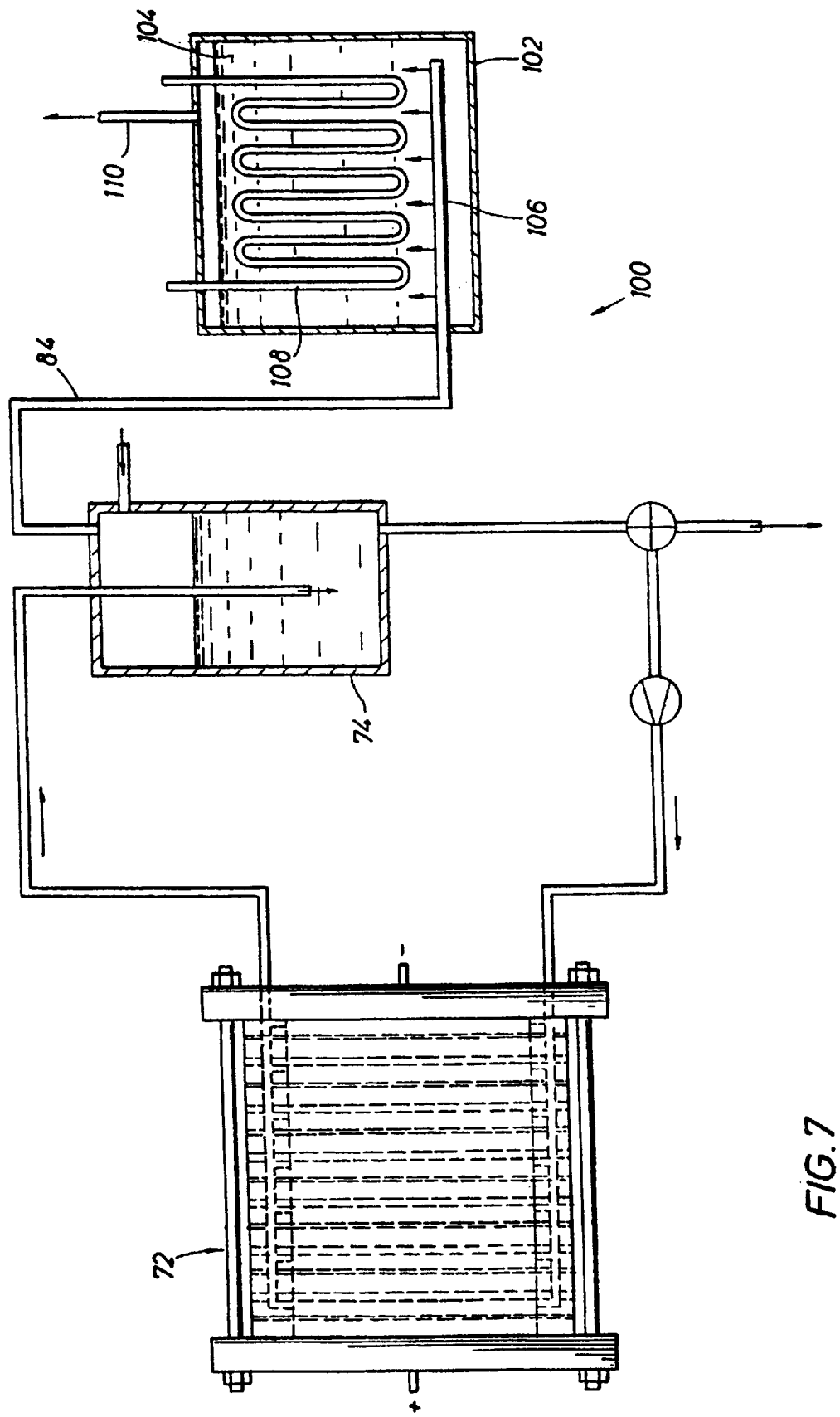
FIG. 7 is a schematic diagram of the apparatus of FIG. 6 in combination with ancillary equipment used in a process for the purification of water.

FIG. 7 is a schematic diagram of the apparatus of FIG. 6 in combination with ancillary equipment used in a process for the purification of wastewater 104. The apparatus 100 is identical to that of FIG. 6 with the addition of a vessel 102 for purifying water. Ozone produced in electrochemical cell 72 and separated in tank 74 is delivered to vessel 102 through pipe 84. The ozone is evenly distributed in the vessel 102 through a porous, non-corrosive metal tube 106, preferably made of titanium, for introducing very fine ozone containing gas bubbles into the water 104. Ozone bubbles rise up through the water 104 where they can contact organic and/or biological material contained in wastewater 104. The ozone, which may contain hydrogen peroxide, is combined with ultraviolet light from serpentine-shaped UV lamps 108 to produce hydroxyl radicals which react non-selectively with dissolved organics to cause their complete oxidation to carbon dioxide ($CO_2$) and water. Oxygen and carbon dioxide are then released from the vessel 102 through exhaust pipe 110. The wastewater may be purified either in a batch or continuous process as will be apparent to one with ordinary skill in the art.

It will be apparent to one with ordinary skill in the art that the methods of the present invention may be accomplished through numerous equivalent embodiments including various geometric configurations.

The method of the present invention can include the disengagement of the product ozone gas from water. However, this can be easily accomplished in a vessel of short residence time where the ozone will quickly disengage from the water. In this manner, ozone may be collected in a concentrated gaseous product which facilitates its use in numerous applications. For example, the product ozone of the present invention may be applied to severe waste water applications. Prior art devices such as those taught by Stucki require the intimate contact of the waste water 4 with the anode. This caused numerous problems as the contaminants of the waste water would foul the anode and reduce cell efficiency. This problem has been overcome by the present invention.

The following examples show the function of the present invention and some of its preferred embodiments.

EXAMPLE 1

Referring to FIG. 2 and to FIG. 6, a trial run of the disclosed invention was practiced. Lead dioxide, electroplated onto a sintered porous titanium substrate (available from Astro Met, Inc. of Cincinnati, Ohio), was used as the anodic electrode material. Prior to applying the lead dioxide electrocatalyst layer, the porous titanium substrate was first cleaned by glass bead blasting, followed by sonication in water, and plated with a thin layer of platinum, using a commercial plating solution, such as E-401 (available from Engelhard Corporation of East Newark, N.J. A commercially available platinum-catalyzed gas-diffusion electrode (available from ELAT, E-TEK, Inc. of Natick; Mass.) was used as the cathodic electrode material. The anodic and cathodic structures each had an active area of 25 $cm^2$. The anodic and cathodic electrocatalyst layers were impregnated with a 5 wt % NAFION solution in a mixture of lower aliphatic alcohols and 10% water (obtained from Aldrich Chemical Company) and dried, yielding PEM loadings of approximately equal to 0.6 mg. $cm^{-2}$. The PEM-impregnated cathodic gas diffusion electrode was bonded to one side of a precleaned Dow experimental proton exchange membrane (XUS-13204.20) by means of hot-pressing under optimum conditions as described previously. The PEM impregnated lead dioxide-plated porous titanium substrate (as the anodic electrode) was placed on the other side of the Dow proton exchange membrane.

The membrane and electrode assembly obtained, along with two pieces of platinum-plated expanded titanium metal (where one each of the expanded metal sheets was in contact with the other planar surfaces of the anodic and cathodic electrodes), together with two Teflon gaskets, were inserted between two platinum-plated titanium endplates of a single electrochemical cell, representative of that shown schematically in FIG. 2. The chemically stable Teflon gaskets were used to seal the cell components on bolting the endplates, together with electrically insulated bolts and nuts, using a torque of 50 inch-pounds. Electrical connections between the positive and negative endplates and a Hewlett-Packard model 6572A DC power supply were made, using insulated wire leads. Two additional screws, placed on the sidewall of each endplate, allowed the measurement of cell voltages, using a Fluke (model 8050A) digital multimeter.

Performance characterizations of the single electrochemical cell were carried out using the test apparatus shown in FIG. 6. Teflon swagelok fittings and Teflon tubing were used in connecting the electrochemical cell to the source of pressurized oxygen gas, Teflon-lined pump (Cole-Parmer micropump model 020-000), water/gas separator (water reservoir) and gas-phase ozone analyzer. The water/gas separator (water reservoir) was made of Pyrex glass. Pure oxygen gas as a cathodic depolarizer was supplied in the manner of a single pass to the cathodic inlet port from a pressurized cylinder at a pressure of 40 psi. To maintain a pressure of 40 psi within the cathode space in the electrochemical cell, a back-pressure regulator set at 40 psi was connected to the cathodic outlet port. While maintaining a constant pressure of 40 psi, an oxygen gas flow rate through the cathode space of the electrochemical cell of 500 ml $min^{-1}$ was achieved. Water was recirculated continuously over the surface of the anode at a flow rate of 200 ml $min^{-1}$ from the water reservoir which contained 300 ml of water. The return water recirculation loop passed through a heat exchanger (Astro Metallurgical, Inc.; ACX heat exchanger, model 4X8-14) before entering the anodic inlet port.

An ozone monitor (Ozone Research and Equipment Corporation, model 03M-110) was used for measuring gas-phase ozone concentrations. The ozone-containing gas stream was separated from the fluid flow exiting from the anodic outlet port in the water/gas separator at atmospheric pressure. The gas stream was then fed into the inlet of the ozone monitor under atmospheric pressure. This instrument measures the absorption of UV light by ozone at 254 nm and provides a direct determination of ozone concentrations in terms of mg/standard liter or mg $min^1$. Knowing the amount of electrical charge that passed during the electrochemical formation of ozone allowed a determination of its current efficiency to be made.

The experimental parameters varied systematically were the applied current density and electrochemical cell temperature. The corresponding parameters measured were the cell voltage and the concentration of ozone in the gas phase. The dependence of electrochemical cell voltage on current density for various cell temperatures is shown in FIG. 3. Cell voltages were recorded 60 minutes after applying each current density value, so as to allow steady state conditions to be reached. Constant electrochemical cell temperatures were maintained by circulating water from a large constant temperature water bath (Lamda model K-4IRD) through the heat exchanger. The cell temperature close to the PEM/electrode interfaces was measured by means of a thermocouple probe placed in a thermowell that was drilled into the sidewall of one of the titanium endplates at a location close to the electrode surface. It can be seen from FIG. 3 that the cell voltage increases rapidly at low current densities followed by a more gradual increase at higher current densities. However, the cell voltage decreases with increasing temperature at any given applied current density. The cell voltage is a combination of the reversible cell voltage, overpotential losses at each electrode and ohmic drops internally within the M&E assembly and in the external electrical connections.

The variation of ozone current efficiency with applied current density for a number of electrochemical cell temperatures is presented in FIG. 4. The ozone current efficiencies were highest for the lowest cell temperature and decreased for any given current density with increasing temperature. At the lowest temperature, the ozone current efficiency-current density profile approached a maximum current efficiency of the order of 15% at a current density of approximately 2.5 A cm$^{-2}$.

It is apparent from the profiles given in FIG. 3 that the energy required to impress a given current density between the anode/proton exchange membrane/cathode sandwich decreases with increasing electrochemical cell temperature. The profiles given in FIG. 4 show that, at high current densities, the ozone current efficiency is only slightly affected with increasing electrochemical cell temperature.

At a current density of 1.6 A cm$^{-2}$, the rate of ozone production by the electrochemical cell was 25 mg of $O_3$ per minute. Taking the electrochemically active dimensions of the cell (5 cm×5 cm×0.6 cm), yields a volume of 15 cm$^3$. This illustrates the compact nature of the electrochemical cell of the present invention. Since single cells of the present invention can be stacked in series to form a unitary structure, as represented schematically in FIG. 5, further stacking will result in a high ozone output within extraordinarily compact dimensions.

EXAMPLE 2

Referring now to FIG. 1 and FIG. 6, another example of the performance derived from the disclosed invention is outlined. The anodic electrode was prepared in a manner identical to that described in Example #1 above. However, a PEM-impregnated high surface area palladium black-catalyzed, gas-diffusion electrode was used as the cathodic electrode material. The palladium electrocatalyst layer was prepared by adding 3 ml of water to 1.68 g of high surface area palladium black powder (Johnson Matthey, Inc.) and sonicated for 20 minutes. 0.22 g of Teflon emulsion (available from DuPont) was added to this mixture, followed by 20 minutes of additional sonication, the mixture was then applied to one side of a commercially available gas-diffusion electrode (E-TEK, Inc.) and heated in an inert atmosphere at 350° C. for three hours.

The PEM-impregnated anodic and cathodic electrode structures, each having an active area of 5 cm$^2$, were bonded on either side of a precleaned segment of NAFION 117 PEM material. The membrane and electrode assembly obtained, together with two Teflon gaskets, were inserted between titanium endplates of a single electrochemical cell, represented schematically in FIG. 1. The inner surfaces of the titanium endplates were electroplated with a thin platinum film to prevent poorly electronically conducting oxide film growth on the surfaces of the endplates. Humidified air was supplied to the inlet port of the cathodic endplate from a pressurized air cylinder. A back pressure regulator was connected to the cathodic outlet port and set to give an air pressure within the cathode space of the electrochemical cell of 80 psi, while allowing an air flow rate of 500 ml min$^{-1}$. Water was recirculated continuously over the back surface of the anode at a flow rate of 150 ml min$^{-1}$. The anodic water reservoir had a volume of 500 ml.

Performance characterizations of the single electrochemical cell were carried out using the experimental test apparatus shown in FIG. 6 and as described in Example 1 above, except that electrical connections on the outside surfaces of the titanium endplates were made to a Hewlett-Packard (model 6282A) DC power supply. Cell voltages were recorded 30 minutes after applying each current density value, so as to allow steady state conditions to be reached. The dependence of electrochemical cell voltage on current density for various cell temperatures is shown in FIG. 8. The cell voltages increased almost linearly with increasing current density and decreased with increasing temperature for any given applied current density.

Dissolved hydrogen peroxide in water electroosmotically transported through the proton exchange membrane was sampled at the exit port from the cathode endplate, shown in the schematic given in FIG. 1. Hydrogen peroxide concentrations were measured using an Orbeco Aqua Analyzer II spectrophotometer. Dissolved ozone concentrations were determined by colorimetry at 600 nm, using samples of ozonated water withdrawn from the water/gas separator, shown in the schematic given in FIG. 6. The highest dissolved ozone concentrations in water, measured at atmospheric pressure, were in the range 10–20 ppm. The values of dissolved ozone were influenced considerably by the temperature of the electrochemical cell. Ozone gas concentrations were determined, as described in Example 1 above, using gas samples withdrawn from the water/gas separator, as illustrated in FIG. 6.

The variation of ozone current efficiency with electrochemical cell temperature for a number of current densities is given in FIG. 9. The current efficiency-temperature profiles go through a maximum at approximately room temperature for all current densities. This is a considerable advantage for the PEM-based electrochemical cell of the present invention. The profiles presented in FIG. 9 show that the current efficiency maximizes at 18–19% on operating the electrochemical cell at a current density of 1.6–2.0 A cm$^{-2}$ and a temperature of 25° C.

The electrochemical cell, represented schematically in FIG. 1, yielded an ozone production rate of 5 mg of $O_3$ per minute. The cell had electrochemically active dimensions of 2.24 cm×2.24 cm×0.3 cm giving a volume of 1.5 cm$^3$. Again this example illustrates the compact nature of the electrochemical cell of the present invention for the production of ozone gas.

Figure 10:
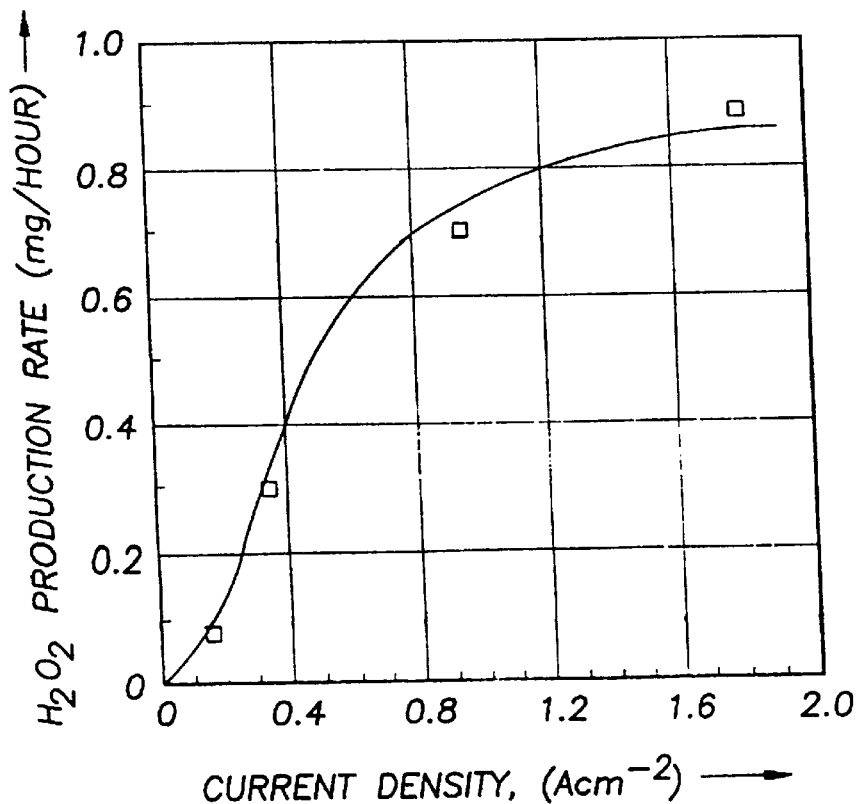
FIG. 10 is a chart showing the variation of hydrogen peroxide production rate with current density for the air depolarized ozone electrolysis cell of FIG. 1.

Variation of the hydrogen peroxide production rate with applied current density on operating the electrochemical cell represented schematically in FIG. 1 in a paired oxidant synthesis manner is given in FIG. 10. The hydrogen peroxide production rate increases with increasing current density and approaches a maximum value at an applied current density of 1.6 A cm$^{-2}$. Because of the low hydrogen peroxide production rates, calculated current efficiencies were very low and, in all cases, were less than 1%.

Another embodiment of the present invention may be referred to as an electrochemical cell for the production of ozone incorporating a cathodic depolarizer. A cathodic depolarizer totally eliminates hydrogen evolution at the cathode and may lower the cell voltage required to produce ozone.

Application of a DC source of electrical energy to two electronically conducting electrodes immersed in an aqueous electrolyte can bring about the decomposition of water molecules into their constituent elements, namely hydrogen and oxygen gases. This process is particularly favored if the anions and cations associated with the electrolyte do not undergo electrochemical reactions at the electrode/solution interfaces. Aqueous solutions of acids, salts and bases are most commonly used as electrolyte solutions. The mineral acids: sulfuric; phosphoric; tetrafluoroboric and hexafluorophosphoric are particularly suitable. It is also anticipated that phosphonic, sulfonic, perfluoro bis-sulfonimides and the corresponding carbanion acids in monomeric, dimeric, oligomeric or polymeric forms would be operable according to the present invention. Supplying an external source of DC electrical energy to an electrochemical cell that brings about the decomposition of water is referred to as an electrolysis process and the electrochemical cell is referred to as an electrolysis cell. In order to minimize heating effects within the electrolysis cell and, hence, to lower the consumption of electrical energy, the positive and negative electrodes are placed as close as possible to each other without short circuiting taking place. In order to minimize the space between the positive and negative electrodes, a separator material is usually placed between them. Separators are thin film materials, either inorganic (asbestos) or organic (Daramic or Celgard) in nature, and are electrical insulators containing microporous channels or pathways that allow flow of ions through the material. A requirement for a separator to be used is that it should be well wetted by the electrolyte solution in the electrolysis cell and should be chemically and electrochemically stable.

In aqueous acid solutions, the decomposition of water involves two electrochemical reactions which take place at the positive and negative electrodes. At the positive electrode, water molecules are oxidized, liberating oxygen gas and protons (which transport ionic current in the solution) and electrons which flow through the external circuit and power source to the negative electrode. This electrochemical reaction is represented by Equation [8] and has a standard electrode potential of 1.23 V.

$$2H_2O \rightarrow O_2 + 4H^+ + 4e^-; E^o = 1.23 V (25^\circ C.) \quad \text{EQUATION(8)}$$

At the negative electrode, the protons recombine with the electrons to liberate hydrogen gas, which is represented by Equation [9] and has a standard reversible potential of 0.00 V.

$$4H^+ + 4e^- \rightarrow 2H_2; E^o = 0.00 V (25^\circ C.) \quad \text{EQUATION (9)}$$

If the nature of the catalytic surface of the positive electrode is changed, a competing electrochemical water oxidation reaction may become more favorable. This competing water oxidation reaction involves the liberation of ozone gas and is represented by Equation [10] which has a reversible potential of 1.51 V.

$$3H_2O \rightarrow O_3 + 6H^+ + 6e^-; E^o = 1.51 V (25^\circ C.) \quad \text{EQUATION (10)}$$

Based on thermodynamic criteria, it is apparent from Equations [9] and [10] that the minimum cell voltage required to decompose water electrochemically into hydrogen and ozone gases under standard conditions requires a minimum of 1.51 V to be applied between the positive and negative electrodes. Due to electrical resistance in the electrolyte solution between the positive and negative electrodes and the overpotentials required in order to make reaction [9] and [10] proceed at significant rates at 25° C., the actual cell voltage will be on the order of 3.0 V.

As a first step to lower this actual cell voltage and, hence, minimize the consumption of electrical energy, the electrodes need to be placed as close as possible to each other. This is greatly facilitated by the use of an ion exchange membrane, such as a proton exchange membrane, which can have thicknesses in the range 25–175 urn (1–7 mils). Use of an ion exchange membrane can yield a so-called "zero gap" between the positive and negative electrodes. It is also advantageous if the ion exchange membrane is a proton-conducting membrane, such a perfluorinated sulfonic acid polymer sold by DuPont under the trademark NAFION 117, which would enable the electrochemical reaction to proceed as described by Equations [9] and [10].

A second step in lowering the cell voltage and, hence, minimizing electrical energy consumption, is to coat the positive and negative electrodes with electrocatalyst layers that speed up the rates of the hydrogen evolution reaction and the ozone formation reaction. It is well known that platinum is the most effective electrocatalyst for hydrogen evolution, particularly in acid f; solutions, and that lead dioxide is highly effective for the electrochemical formation of ozone from water. However, placing the electrodes as close as possible to each other and using the most effective anodic and cathodic electrocatalysts may lower the cell voltage only a few hundred millivolts.

It is almost impossible using these approaches to reduce the cell voltage for the electrochemical production of ozone from water much below 3.0 V. A different result is achieved if the cathodic reduction product is not hydrogen but involves another reaction leading to a different product. Suppose that the hydrogen evolution reaction is replaced by a cathodic reduction reaction taking place at a more positive potential than that at which hydrogen is evolved; then the reversible potential for this reaction would be more favorable and the cell voltage would be reduced. The selection criterion for chemicals that could partake in an alternative cathodic reduction reaction, that is, function as cathodic depolarizers, is that they have a thermodynamic reversible potential more positive than that corresponding to the evolution of hydrogen gas, which is represented by Equation [9]. It is also desirable that these cathodic depolarizers be abundantly available, or readily reoxidizeable, for recycling into the electrolysis cell.

Examples of potential cathodic depolarizers that could be used in an electrolysis cell containing an acidic electrolyte and which could be combined with the anodic oxidation of water, liberating ozone gas, are given in Table 1, including oxygen. As seen from the table, some of these cathodic depolarizers exist in the gas phase, while others are acids or salts and can be exploited only when dissolved in water. All of the cathodic depolarizers identified in Table 1 support high electrochemical reaction rates, that is high current densities at low overpotentials.

TABLE 1

| Cathodic | Depolarizer Phase | Cathodic Reaction | Reversible Potential | Theoretical Cell Voltage with $O_3$ Evolution as Anodic Reaction |
|---|---|---|---|---|
| Chlorine | Gas Phase | $Cl_2 + 2e^- \rightarrow 2Cl^-$ | 1.36 V | 0.15 V |
| Bromine | Gas Phase | $Br_2 + 2e^- \rightarrow 2Br^-$ | 1.09 V | 0.42 V |
| Chlorine Dioxide | Gas Phase | $ClO_2 + H^+ + e^- \rightarrow HClO_2$ | 1.299 V | 0.23 V |
| Dinitrogen Tetroxide | Gas Phase | $N_2O_4 + 4H^+ + e^- \rightarrow 2NO + 2H_2O$ | 1.035 V | 0.475 V |
| Oxygen | Gas Phase | $O_2 + 4H^+ + 4e^- \rightarrow 2H_2O$ | 1.23 V | 0.28 V |
| Air | Gas Phase | $O_2 + 4H^+ + 4e^- \rightarrow 2H_2O$ | 1.23 V | 0.28 V |
| Ferric Chloride | Aqueous Phase | $Fe^{3+} + e^- \rightarrow Fe^{2+}$ | 0.77 V | 0.74 V |
| Benzoquinone | Aqueous Phase | $BQ + 2H^+ \, 2e^- \rightarrow HQ$ | 0.70 V | 0.81 V |
| Hypobromous Acid | Aqueous Phase | $HBrO + H^+ + 2e^- \rightarrow Br + H_2O$ | 1.33 V | 0.18 V |
| Hypochlorous Acid | Aqueous Phase | $HClO + H^+ \, {}^{2e^-} \rightarrow Cl + H2O$ | 1.48 V | 0.03 V |
| Sodium Ferricyanide | Aqueous Phase | $[Fe(CN)_6]^{3-} + e^- \rightarrow [Fe(CN)_6]^{4-}$ | 0.36 V | 1.15 V |
| Sodium Nitrate | Aqueous Phase | $NO_3 + 3H^+ + 2e^- \rightarrow HNO_2 + H_2O$ | 0.93 V | 0.58 V |

This is particularly true if these depolarizers are utilized in conjunction with appropriate cathode electrode structures. In the case of the gas-phase cathodic depolarizers, a gas-diffusion electrode would be most suitable. However, for the cathodic depolarizers that can only be used when dissolved in water, flow-by, flow-through, packed-bed and fluidized-bed electrode structures are more advantageous in order to achieve high current densities.

The gaseous-phase cathodic depolarizers could be supplied to the negative electrode under pressure, which would further increase the electrochemical reaction rate, that is, allow even higher current densities to be realized. The use of a proton exchange membrane as the electrolyte greatly facilitates the use of pressure on introducing the cathodic depolarizer into the electrochemical cell, since it will prevent the removal of electrolyte from the cathode chamber, as would occur with a liquid electrolyte solution, and will allow the electrolysis cell to function, even with different pressures in the cathode chamber and in the anode chamber. Furthermore, the ozone product can be delivered out of the cell under pressure suitable for immediate use in pressurized applications. Since the proton exchange membrane also functions as a separator, it prevents transfer of the cathodic depolarizer and its electrochemical reduction products from diffusing or migrating into the anode chamber, where they could interfere with the evolution of ozone gas from water.

The ozone produced by the electrochemical synthesis of the present invention may be utilized either in aqueous solutions directly from the cell or after disengaging the ozone gas from the water. Aqueous ozone may be preferred in such applications as wastewater treatment and purification. The aqueous cell effluent containing solubilized ozone gas is added into a wastewater stream containing organic substances where the dissolved ozone gas can react with the organic substances. The reaction mechanism, as described above, may optionally be assisted by exposing the ozone-containing wastewater stream to ultraviolet radiation which promotes the formation of hydroxyl and peroxyl radicals. It is preferred that a residual of ozone be maintained in the wastewater stream until immediately prior to use, at which time the ozone should be eliminated from the water. The ozone can be eliminated either by decomposition or disengagement.

Some ozone applications require that the ozone gas be separated from the water and applied in the gas phase. Typically, the ozone gas will be fed to a chamber where the ozone gas can react with a given reactant material. In applications requiring high concentrations of ozone, this chamber may be evacuated of air to avoid dilution of the ozone. Following completion of the reaction, the ozone is eliminated from the chamber and the chamber is filled with air to allow safe handling and removal of sterilized items. Ozone may be eliminated from the chamber by decomposition or by evacuation of the ozone gas. In order to improve the conditions for sterilization or disinfection of biological materials and residues within the chamber, the temperature, pressure and humidity inside the chamber may be controlled. Control of conditions in the chamber is most important where the chamber is a chemical reaction vessel. In a chemical reaction vessel, the ozone will react with other chemical reactants to produce a commercial product rather than the sterilization of biological materials.

The ozone produced by the present invention may be used for numerous applications. One example is the treatment of waste water. Such waste water treatment may be performed with or without the use of ultraviolet light. The ultraviolet light radiation is capable of producing hydroxyl radicals from ozone fed into a waste water stream.

A second application for the ozone of the present invention is the sterilization of medical tools and apparatus. Currently, medical instruments are sterilized in ethylene oxide-containing cabinets where the instruments are exposed to ethylene oxide for a period of 4 to 5 hours. The disadvantages of such systems include the fact that the ethylene oxide is extremely flammable in any concentration when combined with oxygen and is also a carcinogen. In addition, under certain conditions, such as a battlefield, there is insufficient time to allow adequate sterilization of instruments. Therefore, there is a need for quick and efficient sterilization of medical instruments as would be provided by the highly concentrated ozone of the present invention.

Another application of a highly concentrated ozone production of the present invention is in the poultry industry. Present hatching technology proscribes the use of large square boxes in which eggs are incubated and hatched.

These boxes become extremely contaminated with organic waste as the chicks break through the shell. Organic material from inside the egg becomes coated on the walls of the box and provides a source of bacterial growth. The concentrated ozone gas of the present invention would provide a means for disinfecting these boxes for reuse in the hatching process.

A particular advantage of the cells according to the present invention is that the ozonizers may be made compact and therefore are useful in such applications as swimming pool sanitization, control of bio-fouling in air conditioning systems, cooling towers, industrial waste treatment applications, i.e., such as phenol, pesticide, cyanide, dye waste, and heavy metals. Further uses include use in bottling and maintaining potable water quality in remote sites, reprocessing aquaria water, odor control or disinfection of sewage. Many of these applications are not currently utilizing ozone due to the high cost of ozonizers heretofore known, the associated cost of air or oxygen preparation and the low concentration of ozone output.

EXAMPLE 3

Yet another application of the present invention is the direct purification of water through operation of an electrolytic cell with internal passages as a hydrogen pump. First, a membrane and electrode assembly was produced in a single step, by pressing an anode two PFSA membrane sheets on either side of PTFE tubing, and a cathode at 400 psi and 220° C. for one minute. It was then mounted in a cell for use as a hydrogen pump in a system configured for use as a water purifier. A diagram of the cell assembly appears as FIG. 13 and the entire apparatus is shown schematically in FIG. 14.

Figure 13:
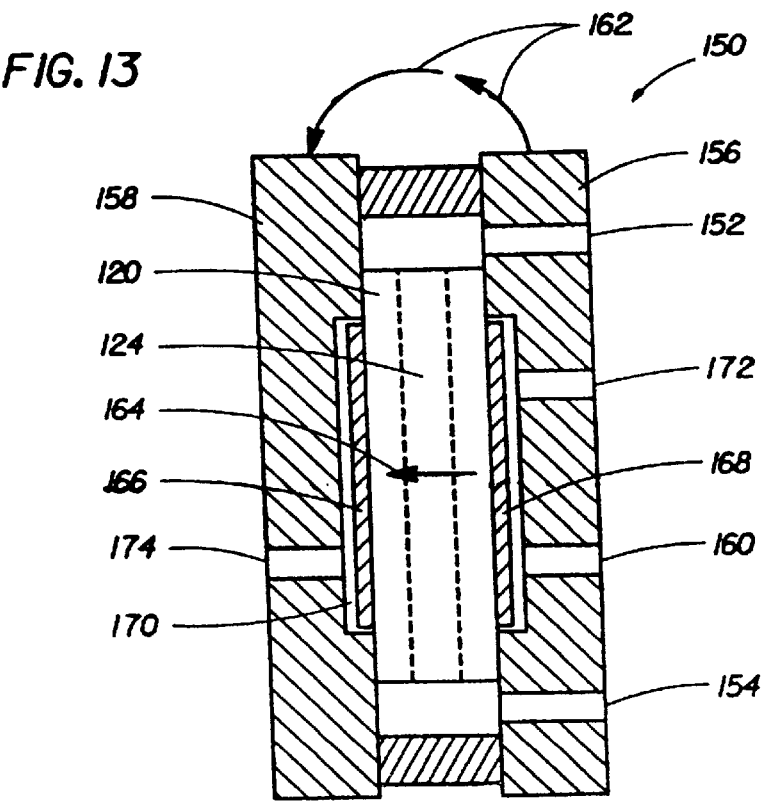
FIG. 13 is cross-sectional view of an electrolytic cell configured as a hydrogen pump.
Figure 14:
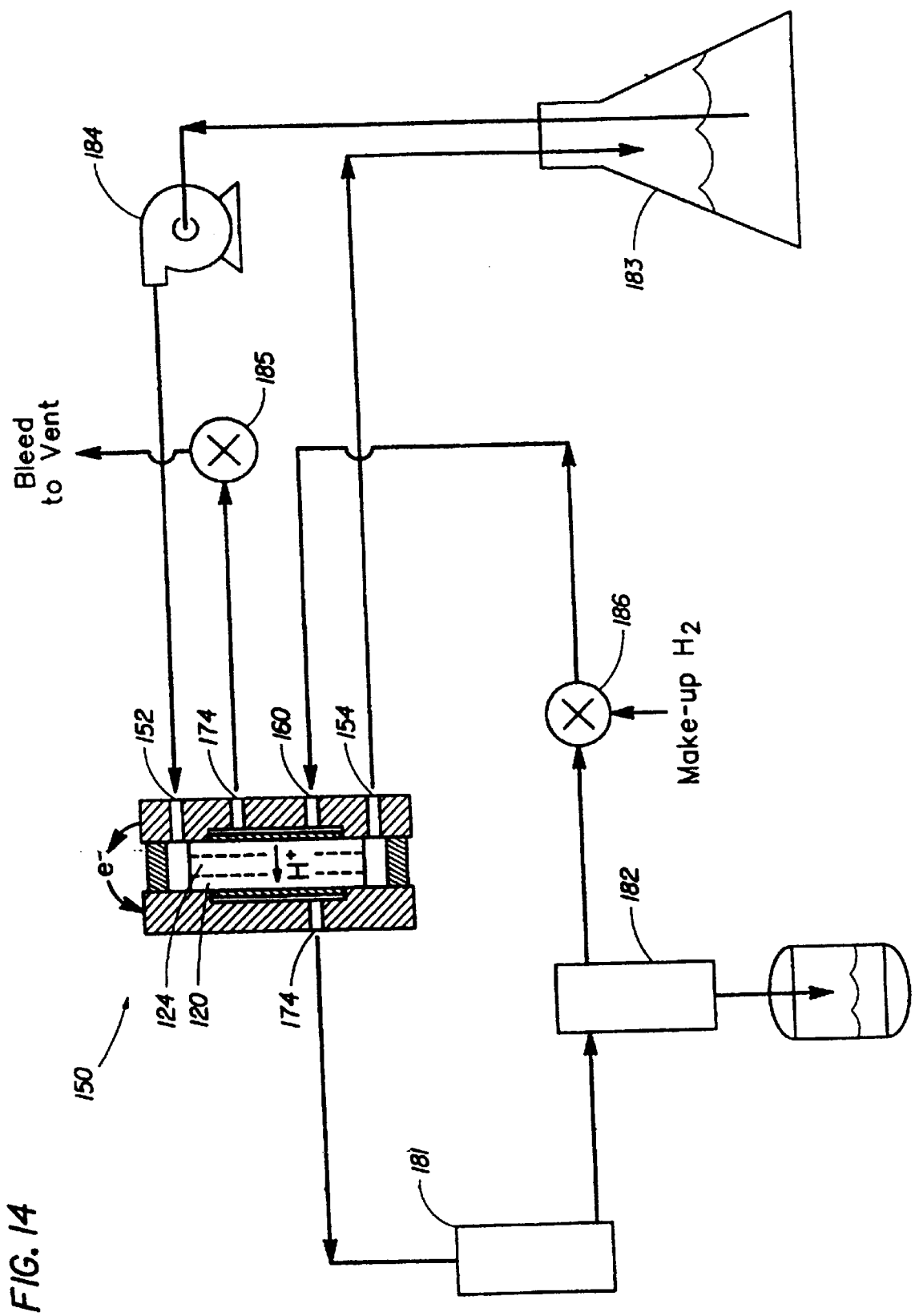
FIG. 14 is a flow diagram of the hydrogen pump of FIG. 13 along with peripheral equipment for cleaning waste water.

The cell 150 of FIG. 13 purifies waste water as it circulates into port 152, through the tubes or internal passages 124 (using like numerals for like elements from FIG. 11) in the membrane 120, out through exit port 154 to a holding tank 183 (See FIG. 14) which feeds the recycle pump 184. Ports 152 and 154 are shown to be part of the anode endplate 156, but could equally well be configured in the cathode endplate 158. Hydrogen is introduced on the anode side through port 160, where an imposed electric field gradient causes it to dissociate into protons and electrons. The electrons flow through the external circuitry of the power supply, as indicated by arrows 162 and are used to impose the field gradient. The protons flow, as indicated by arrow 164, through the membrane 120 to the cathode 166 where they are recombined with electrons to reconstitute a hydrogen molecule. Small amounts of hydrogen are allowed to bleed off through port 172 in communication with a regulated pressure 185.

As the protons pass through the membrane 120, each one takes at least 2 or 3 water molecules with it. Since the hydrogen was supplied as a dry gas, this moves protons from the anode side 168 of the membrane to the cathode 166, building a concentration at the cathode 166 sufficient to cause a build up of water in the cathode compartment 170 which is withdrawn through port 174. This movement of water leads to drying of the membrane 120. Since the only source of water is the waste stream passing through passages 124, the membrane extracts the water that it needs from the waste. During operation, the waste water flow is maintained so that there is always water available for pick-up. The net result is a buildup of clean water in the cathode compartment 170. The wet hydrogen gas and water exit through port 174 and pass through a condenser 181 with the condensate accumulating in the permeate vessel 182 (See FIG. 14), and a depletion of water in the waste water stream. The hydrogen is recycled back to port 160 along with additions of hydrogen made at valve 186. It would not have been possible to build this cell without a membrane possessing internal passages for the distribution of fluid.

Figure 15:
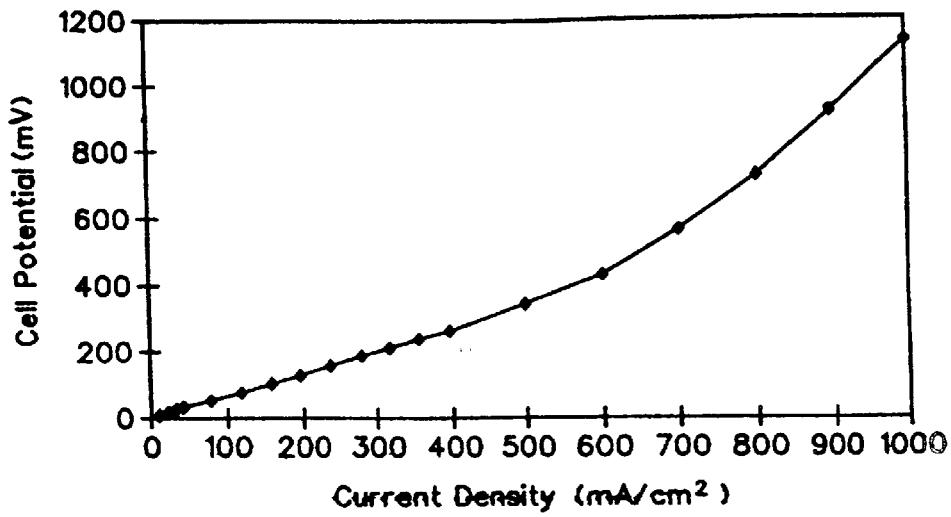
FIG. 15 is a chart showing the variation of cell potential with current density for the cell of FIGS. 13 and 14.

The voltage required to operate this water purification cell was measured as a function of current density. The results of these measurements, commonly called a polarization curve, are plotted in FIG. 15. The slope of the linear, low current density portion of this curve indicates the resistance of the system. (The slope of voltage as a function of current, is the direct measurement of R from Ohms law, V=iR.) When the slope of this curve was measured at current densities below 400 mA/cm$^2$, the resistance of the 25 cm$^2$ cell was found to be 25.9 milliohms, or 647 milliohms per square centimeter.

EXAMPLE 4

Figure 16:
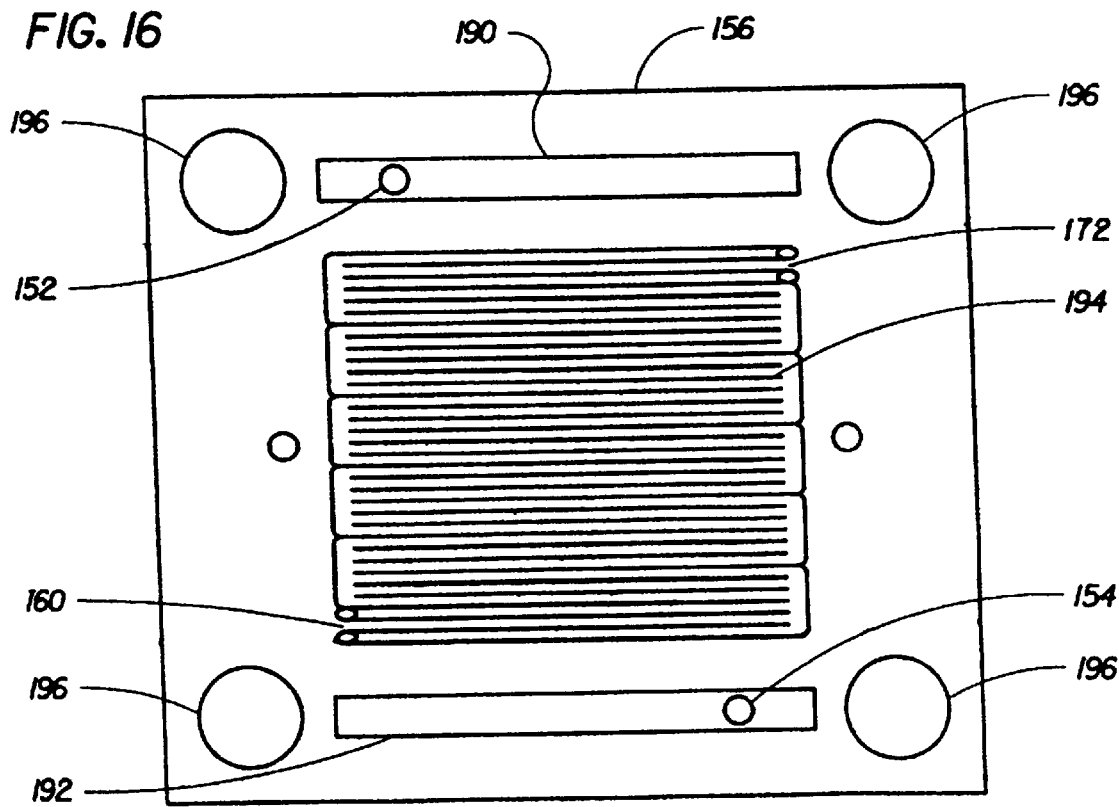
FIG. 16 is an anode endplate used in a regenerative fuel cell.

A membrane and electrode assembly was specifically prepared for use in a regenerative fuel cell having a membrane 10 mils (0.010 inch, 0.254 mm) thick following the procedure in Example 3. The assembly was mounted in a fuel cell with a facility to supply humidification water at the edge of the membrane. The anode endplate 156 of this cell appears in FIG. 16 (using like numbers for like elements from FIG. 13). The endplate 156 more clearly shows the arrangement of various ports. Water is input through port 152 and is distributed along the inlet manifold 190 which provides fluid access to tubes along the edge of the membrane (not shown). After the water passes through the tubulated membrane, it is collected in the outlet manifold 192 and withdrawn through port 154. The gas is fed to the anode through port 172, passes through an array of channels 194 over the anode surface, and exits through port 160. Holes 196 receive bolts for holding the cell together in a filter press arrangement.

Figure 17:
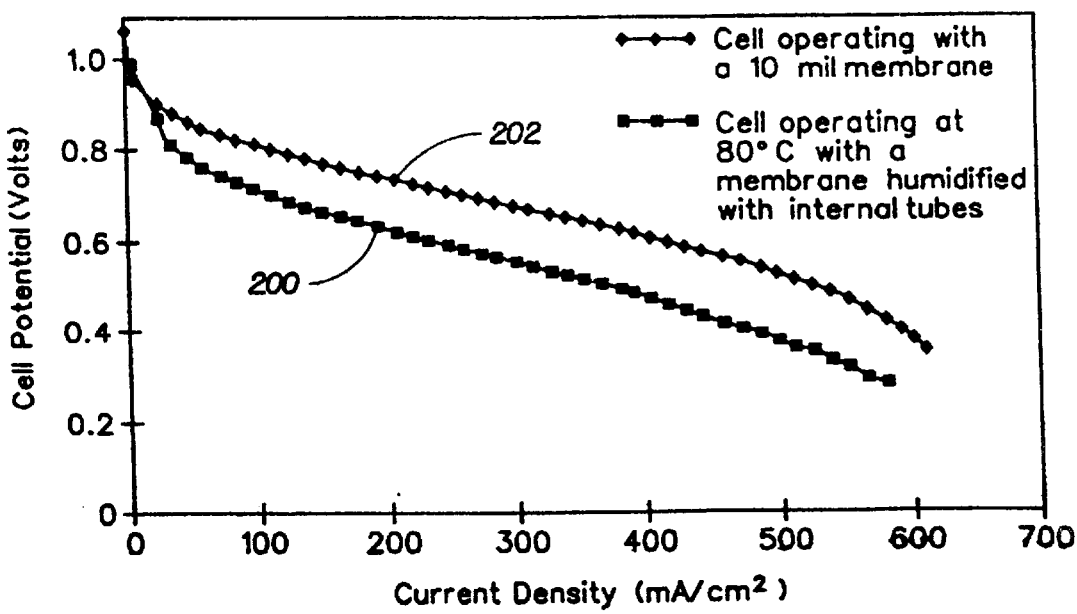
FIG. 17 is a chart comparing the variation of cell potential with current density for regenerative fuel cells having membranes with and without internal tubes.

The fuel cell was operated at various combinations of temperature and gas pressures to determine its operating characteristics. One of the polarization curves 200 obtained at 40 psig for both oxygen and hydrogen gas and a temperature of 80° C. is shown in FIG. 17. A second polarization curve 202 shown in FIG. 17 was obtained using the same cell under the same conditions, except that the 10 mil membrane did not have internal passages and relied upon conventional gas stream humidification.

While the tubulated membrane gave a lower current density for any given cell potential than did the conventional membrane, it provided nearly the same power density. Because a cell with a tubulated membrane does not require a separate chamber for humidification of the gas, as does a cell with a conventional membrane, it is possible to utilize part of the space savings to add additional cells to the stack.

EXAMPLE 5

Figure 18:
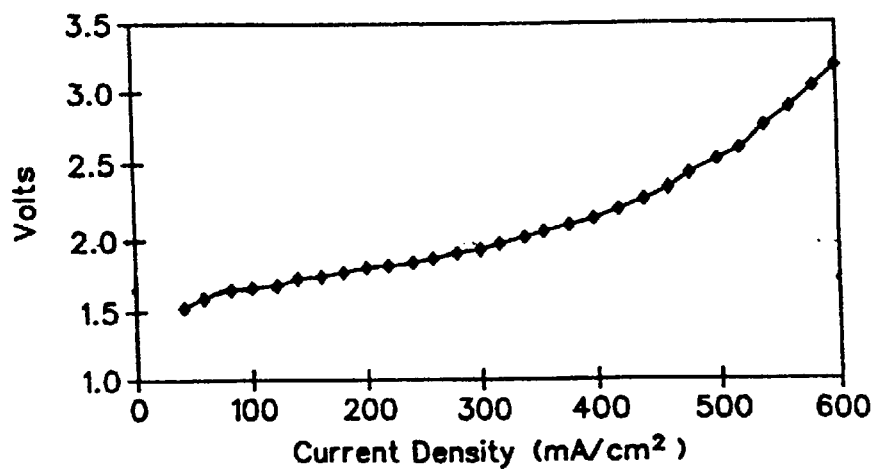
FIG. 18 is a chart showing the variation of voltage with current density for an electrolyzer.

The regenerative fuel cell of Example 4 was reconnected for operation as an electrolyzer. The cell was equipped with the 10 mil PFSA membrane with internal tubes as the only water feed to the membrane. The internal tubes were capable of furnishing sufficient water for both membrane humidification and electrolysis feed. The gas emerging from the cell carried only vapor phase water (unavoidable, with gas in contact with wet membrane) which greatly simplified the task of removing water from the gas stream. The cell was then operated at various combinations of temperature and gas pressures to determine its operating characteristics. The polarization curve obtained at 40 psig and 50° C. is shown in FIG. 18.

EXAMPLE 6

FIG. 22 is a chart reporting the water flow rates and the pressure drop for a membrane/electrode assembly containing internal passages with and without permanent tubes. The data show a dramatic increase in the water flow as well as a substantial decrease in the pressure drop through the tubulated membrane when permanent tubes are added to the tubulated membrane. The enhancement in the water flow clearly indicates that the addition of the tubes was successful in maintaining the structural integrity of the walls of the passages in the membrane. Furthermore, the results seem to indicate that permanent tubes placed in the areas where high compression may be applied to assemble and/or operate the cell is sufficient to obtain substantially increased water flow through the membrane.

It will be understood that certain combinations and subcombinations of the invention are of utility and may be employed without reference to other features or subcombinations. This is contemplated by and is within the scope of the present invention. Many possible embodiments may be made of this invention without departing from the spirit and scope thereof. It is to be understood that all matters herein above set forth or shown in the accompanying drawings are to be interpreted as illustrative and not in any limiting sense.

While the foregoing is directed to the preferred embodiment, the scope thereof is determined by the claims which follow:

What is claimed is:

1. A membrane comprising:
   (a) a sheet of ion exchange material having top and bottom surfaces, wherein the ion exchange material is a fluorinated ion exchange material selected from a group consisting of perfluorinated sulfonic acid polymers, perfluorinated carboxylic acid polymers, perfluoro bisulfonimide polymers, perfluoro phosphonic acid polymers, perfluorinated tetraalkylammonium salt polymers, perfluorinated carbanion acids, and mixtures thereof;
   (b) a passage extending through the sheet in a plane that is substantially parallel to the sheet surfaces, the passage having an inside surface; and
   (c) a tube coupled to the sheet, wherein the tube and passage are in fluid communication.

2. A membrane comprising:
   (a) a sheet of perfluorinated sulfonic acid polymer having top and bottom surfaces;
   (b) a passage extending through the sheet in a plane that is substantially parallel to the sheet surfaces, the passage having an inside surface; and
   (c) a tube coupled to the sheet, wherein the tube and passage are in fluid communication.

3. The membrane of claim 1 wherein the tube and passage have internal diameters that are substantially equal between about ½ mils and about 10 mils.

4. The membrane of claim 1, wherein the tube and the passage are in axial alignment.

5. The membrane of claim 4, wherein the tube and the passage are in concentric alignment.

6. The membrane of claim 1, wherein the passage has first and second ends and wherein the tube is positioned near the first end of the passage.

7. The membrane of claim 6, further comprising a second tube positioned near the second end of the passage.

8. An ion exchange membrane having first and second side surfaces and a passage extending through the membrane in a plane that is substantially parallel to the membrane side surfaces, the passage comprising one or more compression resistant members; an anode electrocatalyst layer formed on the first side surface of the membrane; and a cathode electrocatalyst layer formed on the second side surface of the membrane.

9. An ion exchange membrane having first and second side surfaces and a passage extending through the membrane in a plane that is substantially parallel to the membrane side surfaces, the passage comprising one or more compression resistant members, and wherein the ion exchange membrane comprises a perfluorinated sulphonic acid polymer.

10. The membrane of claim 1, wherein the passage has an inlet and the tube is positioned in the passage in axial alignment with the inlet.

11. The membrane of claim 10, wherein the passage has an outlet and a second tube is coupled to the sheet in axial alignment with the outlet.

12. The membrane of claim 8, wherein the one or more compression resistant tubes are positioned in coaxial alignment within the passage.

13. The membrane of claim 12, wherein the compression resistant tubes are made from partially or fully fluorinated polymers.

14. The membrane of claim 12, wherein the passage is open and has substantially no restriction to fluid flow.

15. A membrane comprising:
   a sheet of ion exchange material that is electronically insulating having top and bottom surfaces, wherein the sheet forms a passage between the surfaces extending through the sheet in a plane that is substantially parallel to the sheet surfaces, wherein the passage has at least one compression resistant tube in direct fluid communication with the passage, and wherein the ion exchange material is a fluorinated ion exchange material selected from a group consisting of perfluorinated sulfonic acid polymers, perfluorinated carboxylic acid polymers, perfluoro bisulfonimide polymers, perfluoro phosphonic acid polymers, perfluorinated tetraalkylammonium salt polymers, carbanion acids, and mixtures thereof.

16. The membrane of claim 15, wherein the ion exchange material is a perfluorinated sulfonic acid polymer.

17. The membrane of claim 15, wherein the passage has an inside surface, first and second ends, a first portion adjacent to the first end and a second portion adjacent to the second end.

18. The membrane of claim 17, wherein the tube is positioned in the first portion of the passage.

19. The membrane of claim 17, wherein the tube is positioned in the second portion of the passage.

20. The membrane of claim 17, wherein the tube is positioned adjacent to the inside surface of the passage.

21. The membrane of claim 20, wherein the tube is positioned between the first portion and the second portion of the passage.

22. A membrane comprising:
   a sheet of ion exchange material that is electronically insulating having top and bottom surfaces;
   a passage extending through the sheet in a plane that is substantially parallel to the sheet surfaces, the passage having an inside surface; and
   a compression resistant means coupled to the sheet, wherein the compression resistant means comprises a support structure positioned in a plane generally normal to the sheet surfaces, wherein the support structure is adjacent the passage.

23. A membrane comprising:

a sheet of ion exchange material that is electronically insulating having top and bottom surfaces;

a passage extending through the sheet in a plane that is substantially parallel to the sheet surfaces, the passage having an inside surface; and a compression resistant means coupled to the sheet, wherein the compression resistant means comprises a resilient strip that is positioned around the passage.

24. The membrane of claim 23, wherein the resilient strip is a flat spring.

25. The membrane of claim 23 wherein the ion exchange material is cation exchange material.

26. The membrane of claim 23 wherein the ion exchange material is anion exchange material.

27. An ion exchange membrane having first and second side surfaces and a passage extending through the membrane in a plane that is substantially parallel to the membrane side surfaces, the passage comprising one or more compression resistant members, and wherein the ion exchange material comprises a layer of cation exchange material and a layer of anion exchange material.

28. The membrane of claim 1 further comprising:

(d) a plurality of passages extending through the sheet in a plane that is substantially parallel to the sheet surfaces; and (e) a plurality of tubes coupled to the sheet in fluid communication with the plurality of passages.

29. The membrane of claim 8, wherein the compression resistant members comprises a tube.

30. The ion exchange membrane of claim 38, wherein the cation exchange material comprises a perfluorinated sulphonic acid polymer.

31. The ion exchange membrane of claim 27, wherein the cation exchange material and the anion exchange material are on opposing sides of the passage.

32. The ion exchange membrane of claim 27, wherein the one or more compression resistant members are tubes positioned in coaxial alignment with the passage.

33. The membrane of claim 2, further comprising:

(d) a plurality of passages extending through the sheet in a plane that is substantially parallel to the sheet surfaces; and (e) a plurality of tubes coupled to the sheet in fluid communication with the plurality of passages.

34. The ion exchange membrane of claim 8, further comprising:

(d) a plurality of passages extending through the sheet in a plane that is substantially parallel to the sheet surfaces; and (e) a plurality of compression resistant members coupled to the sheet in fluid communication with the plurality of passages.

35. The ion exchange membrane of claim 9, further comprising:

(d) a plurality of passages extending through the sheet in a plane that is substantially parallel to the sheet surfaces; and (e) a plurality of compression resistant members coupled to the sheet in fluid communication with the plurality of passages.

36. The membrane of claim 15, further comprising:

(d) a plurality of passages extending through the sheet in a plane that is substantially parallel to the sheet surfaces; and (e) a plurality of compression resistant tubes coupled to the sheet in fluid communication with the plurality of passages.

37. The membrane of claim 22, further comprising:

(d) a plurality of passages extending through the sheet in a plane that is substantially parallel to the sheet surfaces; and (e) a plurality of compression resistant means coupled to the sheet in fluid communication with the plurality of passages.

38. The membrane of claim 23, further comprising:

(d) a plurality of passages extending through the sheet in a plane that is substantially parallel to the sheet surfaces; and (e) a plurality of compression resistant means coupled to the sheet in fluid communication with the plurality of passages.

39. The ion exchange membrane of claim 27, further comprising:

(d) a plurality of passages extending through the sheet in a plane that is substantially parallel to the sheet surfaces; and (e) a plurality of compression resistant members coupled to the sheet in fluid communication with the plurality of passages.

40. The ion exchange membrane of claim 27, wherein the cation exchange material is a fluorinated ion exchange material selected from a group consisting of perfluorinated sulfonic acid polymers, perfluorinated carboxylic acid polymers, perfluoro bisulfonimide polymers, perfluoro phosphonic acid polymers, carbanion acids, and mixtures thereof.

* * * * *